(12) United States Patent
Wang et al.

(10) Patent No.: US 11,367,142 B1
(45) Date of Patent: Jun. 21, 2022

(54) SYSTEMS AND METHODS FOR CLUSTERING DATA TO FORECAST RISK AND OTHER METRICS

(71) Applicant: DataInfoCom USA, Inc., Austin, TX (US)

(72) Inventors: Wensu Wang, Katy, TX (US); Chun Wang, Austin, TX (US); Ji Zang, Sugar Land, TX (US); Kuikui Gao, Houston, TX (US); Wanli Cheng, Houston, TX (US)

(73) Assignee: DataInfoCom USA, Inc., Austin, TX (US)

(*) Notice: Subject to any disclaimer, the term of this patent is extended or adjusted under 35 U.S.C. 154(b) by 156 days.

(21) Appl. No.: 16/732,156

(22) Filed: Dec. 31, 2019

Related U.S. Application Data

(63) Continuation-in-part of application No. 16/146,590, filed on Sep. 28, 2018, now Pat. No. 10,866,962.

(60) Provisional application No. 62/564,468, filed on Sep. 28, 2017.

(51) Int. Cl.
| | |
|---|---|
| *G06Q 40/08* | (2012.01) |
| *G06N 20/00* | (2019.01) |
| *G06Q 10/10* | (2012.01) |
| *G06F 16/2455* | (2019.01) |

(52) U.S. Cl.
CPC ......... *G06Q 40/08* (2013.01); *G06F 16/2456* (2019.01); *G06N 20/00* (2019.01); *G06Q 10/10* (2013.01)

(58) Field of Classification Search
None
See application file for complete search history.

(56) References Cited

U.S. PATENT DOCUMENTS

| | | |
|---|---|---|
| 8,036,979 B1 | 10/2011 | Torrez et al. |
| 8,489,450 B2 | 7/2013 | Agarwal |
| 8,655,695 B1 | 2/2014 | Qu et al. |
| 8,688,607 B2 | 4/2014 | Pacha |
| 9,087,332 B2 | 7/2015 | Bagherjeiran et al. |
| 10,109,014 B1* | 10/2018 | Bischoff ........... G06F 16/90335 |

(Continued)

OTHER PUBLICATIONS

Chen et al., "On the similarity metric and the distance metric," Theoretical Computer Science 410 (2009).
Goshtasby, Image Registration, "Similarity and Dissimilarity Measures," Springer-Verlag London 2012, pp. 7-66.

(Continued)

*Primary Examiner* — Wilson Lee
(74) *Attorney, Agent, or Firm* — Chad Peterson

(57) ABSTRACT

Methods and systems are provided for clustering data for use in training models to predict a loss metric for insurance. The historical data is cleaned and aggregated to a quarterly time granularity and a zip code geographic granularity, and features on which to generate the clusters are selected. Clusters are generated using one or more clustering algorithms, evaluated, and the best set of clusters is selected. Clusters may be grouped together based on cluster characteristics. Each cluster or group of clusters is used to train a development model and a forecast model for the loss metric. The accuracy of the development and forecast models is evaluated, and the clustering process is repeated until the accuracy and stability of the development and forecast models is sufficient. At each iteration, historical data may be removed and/or hyperparameters of the clustering algorithms may be adjusted.

20 Claims, 44 Drawing Sheets

(56) References Cited

U.S. PATENT DOCUMENTS

| | | | |
|---|---|---|---|
| 10,152,681 | B2 | 12/2018 | Stephan et al. |
| 10,896,421 | B2* | 1/2021 | Adjaoute .............. G06Q 20/384 |
| 2002/0087544 | A1 | 7/2002 | Selkirk et al. |
| 2004/0054553 | A1* | 3/2004 | Zizzamia ............... G06Q 10/10 705/4 |
| 2006/0222266 | A1 | 10/2006 | Lauze et al. |
| 2007/0016542 | A1* | 1/2007 | Rosauer ................. G06N 5/022 706/21 |
| 2007/0265533 | A1* | 11/2007 | Tran ..................... A61B 5/0205 600/481 |
| 2009/0073376 | A1 | 3/2009 | Swift |
| 2009/0144070 | A1* | 6/2009 | Psota ................... G06Q 10/083 705/330 |
| 2009/0287628 | A1 | 11/2009 | Indeck et al. |
| 2010/0063851 | A1* | 3/2010 | Andrist ................. G06Q 40/08 705/4 |
| 2010/0205014 | A1* | 8/2010 | Sholer .................... G06Q 10/00 705/4 |
| 2012/0253932 | A1 | 10/2012 | Kim et al. |
| 2012/0331567 | A1* | 12/2012 | Shelton ................ G06Q 20/102 726/28 |
| 2014/0039935 | A1* | 2/2014 | Rivera ................... G06Q 40/08 705/4 |
| 2014/0218165 | A1 | 8/2014 | Johnson et al. |
| 2015/0125832 | A1* | 5/2015 | Tran ................... G09B 19/0092 434/127 |
| 2015/0150017 | A1 | 5/2015 | Hu et al. |
| 2015/0269433 | A1* | 9/2015 | Amtrup .............. H04N 1/00106 382/115 |
| 2015/0348083 | A1* | 12/2015 | Brill ..................... G06Q 20/386 705/14.23 |
| 2016/0071017 | A1* | 3/2016 | Adjaoute ............... G06N 20/00 706/52 |
| 2016/0086185 | A1* | 3/2016 | Adjaoute ........... G06Q 20/4016 705/44 |
| 2016/0100818 | A1* | 4/2016 | Lee ........................ A61B 90/11 600/424 |
| 2016/0162952 | A1* | 6/2016 | Bedingfield, Sr. .......................... G06Q 30/0269 705/14.66 |
| 2016/0358312 | A1 | 12/2016 | Kolb et al. |
| 2016/0379309 | A1 | 12/2016 | Shikhare |
| 2016/0379486 | A1* | 12/2016 | Taylor ................ G01C 21/3691 340/905 |
| 2017/0006135 | A1* | 1/2017 | Siebel ..................... H04L 69/40 |
| 2017/0098278 | A1* | 4/2017 | Carges .................. G06Q 40/08 |
| 2017/0103167 | A1 | 4/2017 | Shah |
| 2017/0154374 | A1* | 6/2017 | Iglesias ................. G06Q 40/08 |
| 2017/0364637 | A1* | 12/2017 | Kshepakaran .......... G16Z 99/00 |
| 2018/0060738 | A1* | 3/2018 | Achin ................... G06Q 10/04 |
| 2018/0322166 | A1 | 11/2018 | Geigel et al. |
| 2018/0350451 | A1* | 12/2018 | Ohnemus ............... G16H 20/30 |
| 2019/0102476 | A1 | 4/2019 | Liu et al. |

OTHER PUBLICATIONS

Ng, "Association Rules and the Apriori Algorithm: A Tutorial," retrieved from <https://www.kdnuggets.com/2016/04/association-rules-apriori-algorithm-tutorial.html> Oct. 24, 2020.

Himmetoglu, "Stacking Models for Improved Predictions," retrieved from <https://www.kdnuggets.com/2017/02/stacking-models-imropved-predictions.html> Oct. 24, 2020.

Brownlee, "How to Develop Convolutional Neural Network Models for Time Series Forecasting," retrieved from <https://machinelearningmastery.com/how-to-develop-convolutional-neural-network-models-for-time-series-forecasting/> Oct. 24, 2020.

Roman, "Unsupervised Machine Learning: Clustering Analysis," retrieved from <https://towardsdatascience.com/unsupervised-machine-learning-clustering-analysis-d40f2b34ae7e> Oct. 24, 2020.

Carrasco, "Gaussian Mixture Models Explained," retrieved from <https://towardsdatascience.com/gaussian-mixture-models-explained-6986aaf5a95> Oct. 24, 2020.

Fleshman, "Spectral Clustering," retrieved from <https://towardsdatascience.com/spectral-clustering-aba2640c0d5b> Oct. 24, 2020.

Maklin, "Affinity Propagation Algorithm Explained," retrieved from <https://towardsdatascience.com/unsupervised-machine-learning-affinity-propagation-algorithm-explained-d1fef85f22c8> Oct. 24, 2020.

Patlolla, "Understanding the concept of Hierarchical clustering Technique," retrieved from <https://towardsdatascience.com/understanding-the-concept-of-hierarchical-clustering-technique-c6e8243758ec> Oct. 24, 2020.

Ali, "Decision Tree with Practical Implementation," retrieved from <https://medium.com/machine-learning-researcher/decision-tree-algorithm-in-machine-learning-248fb7de819e> Oct. 24, 2020.

Khandelwal, "Deep Learning Autoencoders," retrieved from <https://medium.com/datadriveninvestor/deep-learning-autoencoders-db265359943e> Oct. 24, 2020.

Taylor, "Forecasting at Scale," retrieved from <https://peerj.com/preprints/3190/#> Oct. 24, 2020.

Chollet, "Building Autoencoders in Keras," retrieved from <https://blog.keras.io/building-autoencoders-in-keras.html> Oct. 24, 2020.

"Building Classification Models: ID3 and C4.5," retrieved from <https://cis.temple.edu/~ingargio/cis587/readings/id3-c45.html> Oct. 24, 2020.

Seo, "Bidirectional Attention Flow for Machine Comprehension," retrieved from <https://www.semanticscholar.org/paper/Bidirectional-Attention-Flow-for-Machine-Seo-Kembhavi/3a7b63b50c64f4ec3358477790e84cbd6be2a0b4>Oct. 24, 2020.

Kass, "An Exploratory Technique for Investigating Large Quantities of Categorical Data," Applied Statistics, vol. 29, No. 2. (1980), pp. 119-127.

Baak et al., "A new correlation coefficient between categorical, ordinal and interval variables with Pearson characteristics," retrieved from <https://arxiv.org/pdf/1811.11440.pdf> Oct. 24, 2020.

Agrawal et al., "The Quest Data Mining System," KDD-96 Proceedings, pp. 244-249 (2009).

"A Basic Introduction to CHAID," retrieved from <https://smartdrill.com/pdf/A%20Basic%20Introduction%20to%20CHAID.pdf> Oct. 24, 2020.

* cited by examiner

| Internal | External |
|---|---|
| None | - Total Population<br>    By Age<br>    By Gender<br>    By Marital Status<br>    By Veteran Status<br><br>- Population Density<br>- Populaton Change<br>- Educational Attainment<br><br>- Employment Status<br>    Total Workers In Labor Force<br>        Civilian Labor Force - Employed<br>        Civilian Labor Force - Unemployed<br>        Armed Forces<br>    Population Not in Labor Force<br><br>- Occupation<br>    Management, Business, Science, and Arts<br>    Service<br>    Sales / Office<br>    Natural Resources, Construction, and Maintenance<br>    Production, Transportation, Materials Handling<br>- Worker Class<br>    Civilian<br>      Private<br>      Government<br>      Self Employed<br>    Unpaid Family workers<br>    Military<br><br>- Local Industry Representation<br>- Number of vehicles per household<br>- Means of Transportation to Work<br><br>- Median Household Income<br>- Food Stamp Utilization<br>- Percentage of households at or below the Poverty Level |

Figure 6A: External Geo-Demographic Data Categories with Representative Attributes

| Internal | External | | |
|---|---|---|---|
| | Consumer Price Index | • | CPI - Medical Care<br>　Cost of Prescription and OTC drugs<br>　Fees related to professional services provided physicians, dentists, and opticians<br>　Hospital, Nursing Home, and Specialized care service costs<br>　Insurance costs, including commercial medial insurance, BCBS, and HMO premiums<br><br>• CPI - Transportation<br>　Cost of motor vehicle maintenance and repairs<br>　Cost of motor vehicle insurance premiums |
| | Retail Gasoline Prices | • | Per-gallon fuel costs |
| | Residential Real Estate Market Health | • | Single Family Home Values<br>　Single Family Home Values - Absolute<br>　Single Family Home Values - Normalized $/sqft<br>　Single Family Home Rental Prices - Absolute<br>　Single Family Home Rental Prices - Normalized $/sqft<br><br>• Condominium/Apartment Values<br>　Condominium Values - Absolute<br>　Condominium Values - Normalized/sqft<br>　Apartment Values - Absolute<br>　Apartment Values - Normalized/sqft<br><br>• Residential Rental Rates<br>　Monthly Apartment Rental Rates - Absolute<br>　Monthly Apartment Rental - Normalized $/sqft<br>　Monthly Home Rental Rates - Absolute<br>　Monthly Home Rental Rates - $ per square foot<br><br>• Residential Real Estate Market Data<br>　Homes sold for loss (%)<br>　Homes sold for gain (%)<br>　Foreclosures<br>　Price-to-Rent Ratio<br>　Price to Income ratio<br>　For Sale Inventory<br>　Inventory Age<br><br>• Economic Indicators<br>　Conventional Mortgage Rates<br>　Jumbo Mortgage Rates<br>　New Residential Construction<br>　Foreclosures<br><br>• Housing Density<br>　Availability<br>　Occupancy<br>　Vacancies<br>　Owner Occupied Housing Units<br>　Renter Occupied Housing Units |
| | Commercial Real Estate Market Health | • | Commercial Real Estate Availability by Property Type and Class<br>　Supply/Demand for Commercial Space<br>　Supply/Demand for Industrial Space<br>　Supply/Demand for Retail Space<br><br>• Lease Rates by property class<br>• Occupancy Rates<br>• Commercial Construction |

Figure 6B: External Geo-Economic Data Categories with Representative Attributes

| Internal | External | |
|---|---|---|
| None | Local Traffic | • Traffic Density |
| | | • Vehicle Registrations by vehicle type |
| | | • New Vehicle Sales |
| | |     by vehicle type |
| | |     by vehicle make |
| | |     by vehicle model |
| | |     by vehicle year |
| | |     by vehicle size |
| | | • Licensed Drivers |
| | |     by gender |
| | |     by age |
| | | • Daily Traffic Patterns |
| | |     Commuters |
| | |     Public Transportation |
| | | • Commuting Times |
| | | • Commuting Distances |
| | | • Location of Traffic Generators |
| | |     Shopping Centers |
| | |     Transportaton Hubs |
| | |     Hospitals/medical centers |
| | |     Entertainment districts |
| | | • Construction Zones |
| | | • Roadway classifications |
| | | • Roadway elevation changes |
| | | • Speed Limits |
| | Local Traffic Incidents and Accidents | • Traffic Incident Data |
| | |     Location |
| | |     Date |
| | |     Time |
| | |     Cause |
| | | • Accident Outcomes |
| | | • Accident Fatalities |

Figure 6C: External Local Traffic Data Categories with Representative Attributes

| Internal | External | |
|---|---|---|
| None | Land-Based Observations | • Local Observations and Measurements<br>　　Hourly (or better) Temperature<br>　　Daily Min/Max Temperatures<br>　　Hourly (or better) precipitation<br>　　Daily Precipitation Totals<br>　　Sun Rise<br>　　Sun Set<br>　　Average Wind Speed<br>　　Prevailinig Wind Directiokn<br>　　Peak Sustained Wind Speed<br>　　Max Wind Gust Speed<br>　　Cloud Cover<br>　　Visibility<br>　　Climate Normals |
| | Satellite Imagery | • Local Imagery and Interpretations<br>　　Hourly (or better) cloud cover data<br>　　Pollution Monitoring<br>　　Humidity<br>　　Air Quality<br>　　　　Surface Smoke<br>　　　　Surface Dust<br>　　　　Ozone |
| | Radar Returns | • Local Imagery and Interpretations<br>　　Wind Speed<br>　　Wind Direction<br>　　Precipitation Totals<br>　　Precipitation Rate |

Figure 6D: External Local Weather Data Categories with Representative Attributes

| Internal | External | |
|---|---|---|
| | Damaging Wind | • Historical Damaging Wind Watch Declarations<br>• Historical Damaging Wind Warning Declarations<br>• Historical Occurrences<br>　　Location<br>　　Date<br>　　Local Intensity<br>　　Property Damage / Loss Amount |
| | Hail | • Historical Hail Watch Declarations<br>• Historical Hail Warning Declarations<br>• Historical Occurrences<br>　　Location<br>　　Date<br>　　Local Intensity<br>　　Property Damage / Loss Amount |
| | Thunderstorms | • Historical Thunderstorm Watch Declarations<br>• Historical Thunderstorm Warning Declarations<br>• Historical Occurrences<br>　　Location<br>　　Date<br>　　Local Intensity<br>　　Property Damage / Loss Amount |
| | Lightning Strikes | • Cloud to Ground Lightning Strike Frequency<br>• Lightning Damage<br>• Lightning Casualties |
| | Winter Weather | • Historical Winter Weather Watch Declarations<br>• Historical Winter Weather Warning Declarations<br>• Historical Occurrences<br>　　Location<br>　　Date<br>　　Local Intensity<br>　　Property Damage / Loss Amount |
| | Other Severe Weather Warnings | • Excessive Heat Warnings<br>• Heat Advisory<br>• Gale<br>• Flash Flood<br>• Red Flag Fire Warnings<br>• Storm Surge<br>• Hazardous Seas<br>• Small Craft Advisory<br>• Coastal Flood Advisory |

Figure 6E: External Localized Severe Weather Categories with Representative Attributes

| Internal | External | |
|---|---|---|
| | Catastrophes and Natural Hazard Events | • Loss Experience<br>    Property Damage<br>    Crop Damage<br>    Injuries<br>    Fatalities |
| | Catastrophes and Natural Hazard Events | • Location<br>• Date<br>• Presidential Disaster Declaration<br>• Global Disaster Identifier<br>• Named Event |
| | Location-Specific Natural Hazard Peril Assessments | Distance of insured property from:<br>    Flood zones<br>    Hail zones<br>    Tornado zones<br>    Earthquake zones / faults<br>    Brush Fire zones<br>    Landslide zones<br>    Wind Damage<br>    Sinkhole locations<br>    Coastal areas / bodies of water<br><br>• Distance to nearest fire station<br>• Distance to nearest police station |
| | Earthquake Peril | • Lava Flow Hazard Zones<br>• Tsunami Evacuation Zones<br>• Fault Maps<br>• Earthquake History<br>    Magnitude<br>    Frequency<br>    Property Damage / Loss Amount<br>• Seismic Activity |
| | Wildfire Peril | • Historical Occurrences<br>    Location<br>    Date<br>    Local Intensity<br>    Property Damage / Loss Amount<br><br>• Presence/amount of available fuel<br>• Slope<br>• Accessibility |
| | Sinkhole Peril | • Sinkhole Locations<br>• Property Damage / Loss Amount |
| | Hurricane / Tropical Storm Peril | • Historical Occurrences<br>    Location<br>    Date<br>    Local Intensity<br>    Property Damage / Loss Amount |
| | Flood Peril | • Flood Zones<br>• Historical Occurrences<br>    Location<br>    Date<br>    Local Intensity<br>    Property Damage / Loss Amount |
| | Tornado / Damaging Wind Peril | • Historical Tornado Watch Declarations<br>• Historical Tornado Warning Declarations<br>• Historical Occurrences<br>    Location<br>    Date<br>    Local Intensity<br>    Property Damage / Loss Amount |

Figure 6F: External Local Catastrophe Data Categories with Representative Attributes

| Internal | External |
|---|---|
| | Public Safety • Local Fire Protection Capabilities<br>　　　　Emergency Communication Infrastructure<br>　　　　Water Availability and Locations<br>　　　　Department Size<br>　　　　Firestation Location<br>　　　　Fire Station Service Type<br><br>• Local Crime<br>　　　　Violent Crime<br>　　　　Burglary<br>　　　　Larceny<br>　　　　Motor Vehicle Theft<br><br>Public Health • Drug Use<br>• Mortality Data<br>• Behavioral Risk factor Data<br>• CDC Vital Statistics<br>• Opoiod Use / Abuse |

Figure 6G: External Public Health and Safety Data Categories with Representative Attributes

| Internal | Exernal | |
|---|---|---|
| | State and Local Legal and Regulatory Environment | • Motorcycle Helmet Law adoption and enforcement<br>• Recreational Marijuana adoption<br>• Distracted Driving Law adoption and enforcement<br>• Building Code Data<br>    Local Building Codes<br>    Local Building Code Adoption<br>    Local Building Code Enforcement Practices<br>• Alcohol-related incident data<br>• DUI data<br>• Speed camera locations<br>• Speed enforcement<br><br>• Attorneys per Capita<br>    Personal Injury attorneys<br>    Other Attorneys |

Figure 6H: External Legal and Regulatory Data Categories with Representative Attributes

| Internal | Exernal | |
|---|---|---|
| | Industry Benchmarking | Best's Aggregates and Averages |
| | | Best's Insurance Reports |
| | | Best's State Rate Filing |
| | | Best's Financial Suite |
| | Conning & Company | Insurance Segment Reports |
| | | Forecast & Analysis |
| | | Insurance Trends Report |
| | Council of Insurance Agents & Brokers (CIAB) | CIAB rate change reports |
| | SNL Financial | Rate Filings |
| | ISO | ISO Trends |
| | | ISO Fast Track data |
| | | ISO Underwriting Results AY, PY |
| | Perr & Knight | Rate Filings |

Figure 6I: External Industry Benchmarking Data Categories with Representative Data Attributes

| Internal | External |
|---|---|
|  | • Traditional Media Consumption<br>    Platforms<br>    Usage<br>    Daily Household Screentime<br><br>• Social Media Engagement<br>    Accounts<br>    Household profiles<br>    Usage<br><br>• Social Media Monitoring<br><br>• Mobile Phone Usage<br><br>• Life Events<br>    New/Expecting Parents<br>    Marriage/Divorce<br>    New Graduates<br>    New Job/Retiree |

Figure 6J: External Social and Behavioral Data Categories with Representative Attributes

| Internal | | External |
|---|---|---|
| Personal Attributes | • Name<br>• Social Security Number<br>• Gender<br>• Age<br>• Address<br>• Marital Status<br>• Contact Information and Preferences | |
| Residence | • Residence Type<br>• Own or Rent<br>• Mortgage Holder<br>• Time at current residence<br>• Address History | |
| Occupation | • Occupation<br>• Employment Tenure<br>• Employment History<br>• Education | |
| Household | • Spouse / Partner<br>    Name<br>    Social Security Number<br>    Gender<br>    Age<br>    Address<br><br>    Occupation<br>    Employment Tenure<br>    Employment History<br>    Education<br><br>• Number, Ages, and Gender of children<br>• Number of Drivers in Household<br><br>• Household Reported Licensed Driver Data<br>    Drivers' License numbers<br>    License type<br>    License restrictions<br>    Known Impairments<br>    Issuing State<br>    Expiration Date<br>    Years as a licensed driver<br><br>    Driver Training/Improvement Classes - attendance and dates | • Identification of Undisclosed Household Drivers |

Figure 6K: Internal and External Policyholder Personal Data Categories with Representative Attributes

| Internal | | External | |
|---|---|---|---|
| Financial Position | • Total Reported Household Income<br>• Policy Billing History | Consumer Financial Data | • Household Income Verification<br>• 3-Bureau Credit scores<br>• 3-Bureau Credit Reports<br>• Employment Verification<br>• Earnings History<br>• Bankruptcy<br>• Financial Account Data<br>    Investment Accounts / Balances<br>    Savings Accounts / Balances<br>    Cash / Cash Equivalents<br>    Revolving credit accounts<br>    Revolving credit payment history<br>• Outstanding consumer debt balances and repayment schedules<br>    Mortgages<br>    Auto Loans<br>    Student Loans<br>    Home equity loans<br>    Other consumer credit lines<br>• Transaction History and Trends<br>    Purchase History and Locations<br>    Loyalty Card Transactions<br>    Spending Changes<br>    Coupon usage |

Figure 6L: Internal and External Policyholder and Household Financial Position Data Categories with Representative Attributes

| Internal | External |
|---|---|
| • Vehicle Identification Number (VIN)<br>• Vehicle Manufacturer<br>• Vehicle Model<br>• Year<br>• Vehicle Type<br>    Private Passenger Auto<br>    Commercial Vehicle<br>    Motorhome/Recreational Vehicle<br>    Watercraft<br>    Other<br><br>• Vehicle Body Type<br><br>• Vehicle Dimensions<br>    Gross Vehicle Weight<br>    Number of Doors<br>    Bumper Height<br><br>• Vehicle Performance<br>    Number of cylinders/displacement<br>    Horsepower<br>    Acceleration times<br>    Braking times<br><br>• Vehicle Safety Features<br>    Driver and Passenger Restraint Systems<br>    Number of Airbags<br>    Driver Assist Systems<br>        Lane Keeping Assistance/Warning<br>        Blindspot Warning<br>        Collision Warning<br>        Collision Avoidance<br>        Adaptive Cruise Control<br>    Antilock Brakes<br>    Daytime Running Lights<br><br>• Anti-Theft System<br>• Onboard Diagnostic Device<br><br>• Cost New<br>• Aftermarket Additions / Modifications<br><br>• Ownership<br>    Owned<br>    Leased<br>        Lease Term<br>        Term Expiration<br>        Monthly Payments<br>    Financed<br>        Monthly Payments<br>        Payments Remaining<br><br>• Intended Vehicle Use<br><br>• Estimated Annual Miles Driven<br>• Daily commuting miles<br><br>• Vehicle Daytime Location<br>• Vehicle Overnight Location<br><br>• Vehicle Usage Data<br>    Trip-level data - loctions, times, dates, distances traveled<br>    Hard braking events<br>    Average and max speeds | • Vehicle History Reports - inspection, collision, repair, etc<br>    Inspection Dates and Outcomes<br>    Collisions<br>    Repairs<br>    Maintenance History<br><br>• Mileage history<br><br>• Vehicle Safety Ratings<br><br>• Vehicle Crash Test Ratings<br><br>• Theft rates<br><br>• Industry-Wide Claim Frequency and Severity<br>    by vehicle type<br>    by vehicle make<br>    by vehicle model<br>    by vehicle year<br>    by coverage<br>    by zip code (or better)<br>    by zise of loss<br>    by amount of insurance<br>    by cause of loss |

Figure 6M: Internal and External Insured Assets – Vehicles Data Categories with Representative Attributes

Internal

- Dwelling Attributes
  - Construction Year
  - Structure Type
    - Total Living Area (square feet)
    - Number of stories
    - Room count
    - Chimney count
    - Bathroom count
    - Bedroom count
  - Construction Type
  - Foundation type
  - Construction Quality Rating
    - Building Material - Foundation, frame, exterior walls, roof
    - Roof Type
  - Water Source
  - Electric Power Source

- HVAC
  - Central Heating / Air?
  - Number of Air Conditioning Units
  - Primary Heating System Type
  - Secondary Heating System Type

- Time since updates to:
  - Plumbing
  - Electrical
  - Primary Heating System
  - Secondary Heating System
  - Windows
  - Roof
  - Septic System

- Home Safety Features
  - Fire Alarm - type and description
  - Sprinkler system installed?
  - Smoke Detectors - type, number, and description
  - Fire Extinguishers - type and number
  - Burglar Alarm - type and description

- Gate/Controlled Access?

- Presence on Premise of:
  - Pool
  - Animals
    - Number
    - Type
    - Breed
    - Size
    - Bite History
  - Trampoline/skateboard ramp
  - Other External Structures

- Residence Type
  - Primary
  - Secondary
  - Seasonal
- Days Occupied
- Owner occupied?
- Number of families in residence
- Occupant Count

- Size of property in acres
- Elevation above sea level
- Slope
- Assessed Tax Value
- Replacement Cost

- Location Assessment
  - Distance to nearest fire station
  - Distance to nearest police station
  - Total number of policyholders insured within a 1/3/5/10 mile radius
  - Total dollar value of assets insured within a 1/3/5/10 mile radius
  - Total number of policyholders in Zip code
  - Total number of policyholders in MSA
  - Total number of policyholders in County
  - Total dollar value of assets insured in Zip code
  - Total dollar value of assets insured in MSA
  - Total dollar value of assets insured in County

External

- Location-Specific Natural Hazard Peril Assessment
  - Distance of insured property from:
    - Flood zones
    - Hail zones
    - Tornado zones
    - Earthquake zones / faults
    - Brush Fire zones
    - Landslide zones
    - Wind Damage
    - Sinkhole locations
    - Coastal areas / bodies of water Figure 6N: Internal and External Insured Assets – Home Data Categories with Representative Attributes

| Internal | | External |
|---|---|---|
| General | • Customer Tenure<br>• Products Owned<br>• Customer Lifetime Value | |
| Policy | • Policy Type<br>    Auto<br>    Home<br>    Landlord<br>    Renter<br>    Other<br><br>• Policy Term<br>• Policy Effective Date<br>• Times Renewed<br>• Continuous Coverage?<br>• Prior lapse on record?<br>• Length of Lapse<br>• Deductible<br>• State Minimum Coverage Amount? | |
| Policy Coverages | Personal Lines<br><br>• Auto / Vehicle Coverages and Coverage Amounts<br>    Collision<br>    Comprehensive<br>    Underinsured Motorist<br>    Uninsured Motorist<br>    Medical Payments<br>    Liability<br>    Personal Injury Protection<br>    Other<br><br>• Homeowners Coverages and Coverage Amounts<br>    Homeowner - Property<br>    Homeowner - Liability<br>    Landlord - Property<br>    Landlord - Liability<br>    Renter<br><br>• Commercial Auto Coverages and Coverage Amounts<br>• Commercial Property Coverages and Coverage Amounts<br>• Other<br><br>• Optional Coverages<br>    Home Contents<br>    Vehicle Contents<br>    Home Electronics<br>    Jewelry<br>    Tools<br>    Art<br>    Musical Instruments<br>    Other | |
| Customer Acquisition | • Channel<br>    Direct<br>    Independent Agent<br>    Captive Agent<br>    Group<br><br>• Producer<br>    Agent / Agency Name<br>    Location / Region<br>    Hierarchy<br>    Commission Structure | |
| Customer Relationship | • Customer - Carrier Interactions<br>    Contact Center - inbound and outbound<br>    CRM<br>    Call Center Representative written notes and comments<br>    Call Recordings<br>    Chat logs<br><br>    Outbound Marketing / Communications | |

Figure 6O: Internal Policyholder-Carrier Interaction Data Categories with Representative Attributes

| Internal | External |
|---|---|
| • Claim Count - Primary Insured and Household<br>    Type<br>    Date<br>    Disposition<br><br>• Claim History and Disposition - Primary Insured and Household<br>    Claim Type<br>    Loss Date and time<br>    Loss Location<br>    Loss Description<br>    Weather at time of incident<br>    Claim Creation Date<br>    Attorney Representation?<br>    Claim Disposition<br>    Incurred Loss Amount<br>    Liability Percent<br>    Salvage and Subrogation<br>    Police Report Filed?<br><br>• Prior Carrier History<br>    Prior Carrier Name<br>    Prior Carrier AM Best Code<br>    Prior Carrier NAIC Code<br>    Customer Tenure with Prior Carrier<br>    Prior Claims Filed?<br>       Type<br>       Date<br>       Disposition | |

Figure 6P: Internal Claim History Data Categories with Representative Categories

| Internal | External |
|---|---|
| • Traffic Incident History - Primary Insured and Licensed Household Members<br>    Major violations<br>    Minor violations<br>    At-fault accidents<br>    Not-at-Fault accidents<br>    DUI<br>    Towing<br>    Glass<br>    License Suspension<br>    Theft/Vandalism<br>    Bodily Injury<br>    Other<br><br>• Home or Homeowner<br>    Liability Claims against homeowner<br>    History of Losses due to natural causes<br>    Theft Loss<br>    Fire Loss<br>    Other<br><br>• Other Policy/Coverage Types<br><br>• Incident Date<br>• Incident Disposition | |

Figure 6Q: Internal Driving History Data Categories with Representative Attributes Development age Claim Age Development age for an accident-month

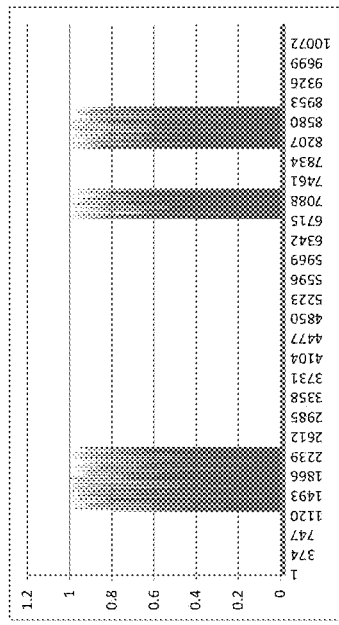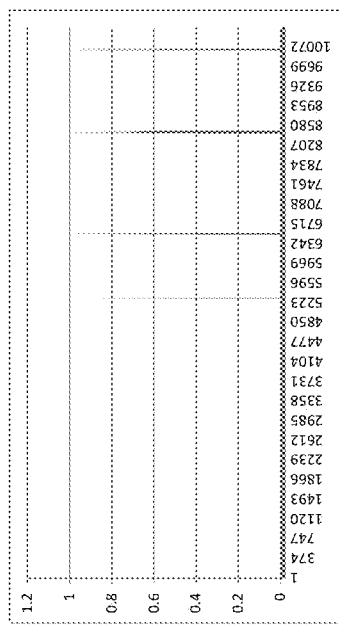
FIG. 19

SYSTEMS AND METHODS FOR CLUSTERING DATA TO FORECAST RISK AND OTHER METRICS

CROSS-REFERENCE TO RELATED APPLICATIONS

The present application claims priority to U.S. patent application Ser. No. 16/146,590, titled "DATABASE MANAGEMENT SYSTEM FOR MERGING DATA INTO A DATABASE," filed Sep. 28, 2018, and claims the benefit of U.S. Provisional Patent Application No. 62/564,468, filed Sep. 28, 2017, which are hereby incorporated by reference herein in their entirety.

BACKGROUND

The present application relates to machine learning technologies as applied to insurance ratemaking, especially with respect to policies that cover events or losses with a long tail over time. More broadly, the present application relates to the prediction of time sequences with a long tail, and aggregations of such sequences.

In many industries, the production cost is known before a product is sold, and therefore pricing tends to be uniform. For those industries where the ultimate cost is not known prior to sale, there is an additional layer of complexity. This is particularly true in industries where risks/costs ex-ante are not specifically known, like default risk on contracts, wireless phone service, insurance, logistics, banking and lending, power and natural gas utilities, etc. In this case, pricing is often provided contemporaneously, based on estimates from a few data points. For example, insurance rates are traditionally determined by actuarial tables which attempt to capture an individual's risk in a few data points. In these industries, automatically integrating all relevant information about a potential customer's assets, environment, and individual characteristics can more precisely assess a prospect's risk, and hence, the price he/she should be offered for a given good or service.

Take, for example, auto insurance policies. A typical auto insurance policy covers several types of losses, including damage to the car (e.g., collision damage), property damage caused by a car accident, and bodily injuries (BI) to either the insured or another occupant of a vehicle involved in the accident. Property damage and vehicle damage claims are often resolved quickly, e.g., within a matter of months. However, bodily injuries caused by an accident often add a long tail to the total claim payout for the accident, because bodily injuries may require long term care and/or may be non-obvious at the time of the accident. Insurance companies need to account for the long tail of BI claims, and reserve enough funds to pay out the policyholder's losses incurred due to the accident.

The chain-ladder method is the traditional actuarial method for calculating loss reserves for insurance. However, the chain-ladder method for calculating loss reserves is only accurate when patterns of loss development in the past can be assumed to continue in the future. Furthermore, the chain-ladder method is only suitable for stable patterns. Neither of these is necessarily true for BI claims, rendering the chain-ladder inadequate for calculation of the loss reserves for auto insurance.

There remains a need for a method to more accurately calculate the loss reserves needed for insurance, especially for claim payout patterns with a long tail. It would be further beneficial if the method could calculate the necessary reserves on a month-by-month or quarterly basis, rather than just year-to-year, as with traditional methods.

SUMMARY

In accordance with the foregoing objectives and others, exemplary methods and systems are disclosed herein to forecast a loss metric (e.g., pure premium) for an insurance policy, or a group of insurance policies, where the payout related to an insured event may have a long tail. Methods and systems are also disclosed to estimate the pure premium or other loss metric of an aggregation of claims.

In one embodiment, the invention relates to a method of clustering historical data, the method comprising: receiving historical data comprising historical policyholder data, historical policy data, historical claims data, historical environmental data, and historical loss metric data, the historical data further comprising at least one input variable; processing the historical data, comprising: joining the historical data; cleaning the historical data; and aggregating the historical data to a specified time granularity and specified second granularity; generating a set of features based on the processed historical data; inputting the feature set into a plurality of clustering algorithms to generate a plurality of sets of clusters, each clustering algorithm generating a set of clusters based on the feature set; evaluating each of the plurality of sets of clusters for stability; and selecting the most stable set of clusters.

In another embodiment, the invention relates to a method of clustering historical data, the method comprising: receiving historical data comprising historical policyholder data, historical policy data, historical claims data, historical external data, and historical loss metric data, the historical data further comprising at least one input variable; segmenting the historical data into a plurality of segments; processing the historical data, comprising: joining the historical data; cleaning the historical data; and for each segment, aggregating the historical data to a specified time granularity and specified second granularity; for each segment, generating a set of features based on the processed historical data; for each segment, inputting the feature set into a plurality of clustering algorithms to generate a plurality of sets of clusters, each clustering algorithm generating a set of clusters based on the feature set; evaluating each of the plurality of sets of clusters for stability; and for each segment, selecting the most stable set of clusters.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 6A-6Q illustrate types of data that may be used by the system as input variables.

FIG. 19 illustrates variables with low data percentages.

DETAILED DESCRIPTION

Embodiments of the present disclosure are best understood by referring to FIGS. 1-30 of the drawings, like numerals being used for like and corresponding parts of the various drawings.

In some examples, the methods and systems discussed herein may improve the efficiency and effectiveness in targeting, acquiring, pricing, and servicing customers in the insurance field. In some examples, the methods and systems discussed herein may provide for better risk assessment at the aggregate and individual level for businesses of all types, but most especially those with risk-sensitive pricing.

As used herein, "historical data" refers to a data set used to train or otherwise create a model, and generally includes multiple training instances, each instance comprising one or more feature inputs and a target output. The target output of a training set may also be referred to herein as a "label." "Current data" or "current input data" refers to data input into the trained model to generate a prediction, forecast, or other output.

"Total paid loss" refers to the amount paid on a claim or aggregation of claims at a specific moment in time during the lifecycle of the claim(s). "Case incurred loss" refers to the total paid loss plus case reserves. "Ultimate loss" refers to the total amount that will have been paid on a claim or aggregation of claims at the end of the lifecycle of the claim(s). "Pure premium" refers to the ultimate loss divided by risk, or number of exposure units, for a claim or aggregation of claims.

Figure 1:
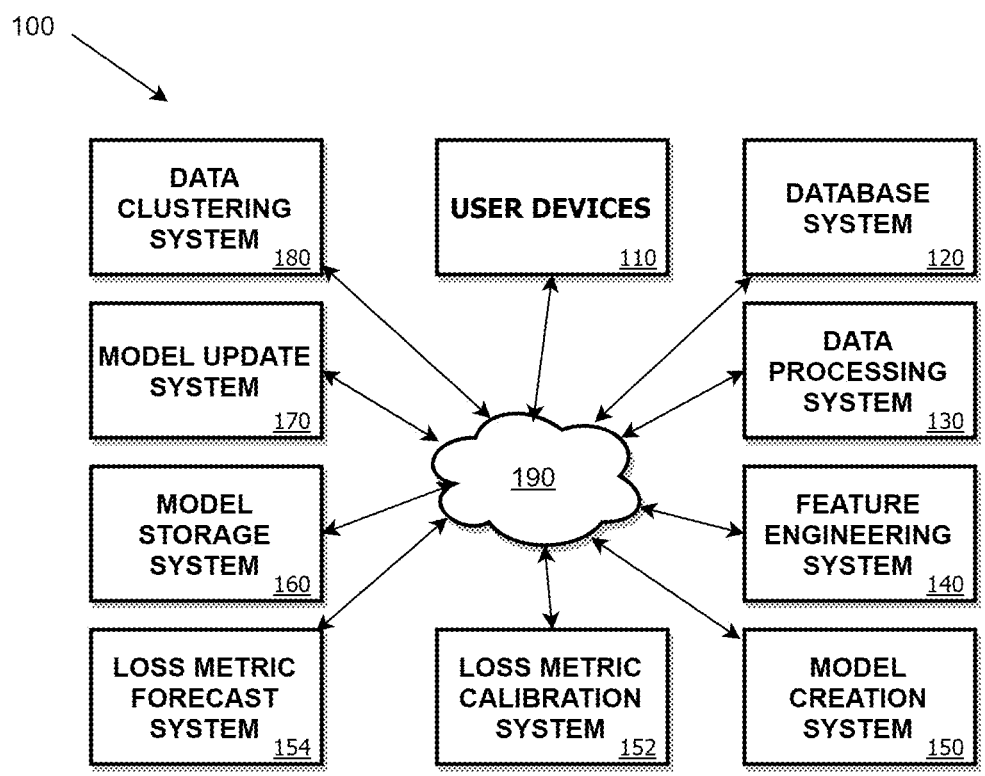
FIG. 1 is a schematic illustration of one example of a prediction system.

Referring to FIG. 1, a block diagram of an exemplary forecasting system 100 is illustrated. The forecasting system may include user devices 110, a database system 120, a data processing system 130, a feature engineering system 140, a model training/creation system 150 for creating models used in loss metric calibration system 152 and loss metric forecast system 154, a model storage system 160, a model update system 170, and a data clustering system 180. The user devices, database system, and each other component may be remote from each other and interact through a communication network 190. Non-limiting examples of communication networks include local area networks (LANs), wide area networks (WANs) (e.g., the Internet), etc.

In certain embodiments, a user may access any of the other systems via a user device 110 connected to the network 190. A user device 110 may be any computer device capable of accessing any of the other systems, such as by running a client application or other software, like a web browser or web-browser-like application.

The database system 120 is adapted to receive, determine, record, transmit, and/or merge information for any number of policyholders, customers, claims, inquiries, potential contacts, and/or individuals.

The data processing system 130 is adapted to segment, process, clean, and/or aggregate data retrieved from the database system 120 to generate a data set for use in training the various prediction models described herein.

The feature engineering system 140 is adapted to reduce the number of variables in the data set. In one embodiment, the feature engineering system accomplishes this by determining the variables in the data set that have the most influence on determining the target. The feature engineering system may determine this by training preliminary models and evaluating the importance of each variable from testing and/or evaluating the preliminary models. After the most important variables have been determined, the feature engineering system may apply feature reduction techniques, e.g., autoencoders, etc., to the remaining variables.

The model creation system 150 is adapted to train or otherwise create (for types of models that do not require training (e.g., kNN)) prediction models, such as the prediction models used in loss metric calibration system 152 and loss metric forecast system 154. The model creation system may be adapted to create any type of model, including but not limited to, classification models, regression models, Markov chains, time series models, state space models, Bayesian models, boosted decision trees, neural networks, convolutional neural networks, recurrent neural networks, LSTM neural networks, or any other appropriate model, or combinations or ensembles thereof. To train a model, the model creation system will generally use a set of historical data, including input variables and a target. Multiple models with different hyperparameters may be created and evaluated to select a preferred model. In one embodiment, a hyperparameter autotuning system may be used to create, test, and select preferred models.

The model storage system 160 is adapted to store the models created by the model creation system 150. Any type of suitable storage system may be used, e.g., a database, file system, etc. If a database is user, the database may be any type of database. For example, the database may be a relational database (e.g., Oracle database, MySQL, Microsoft SQL Server, PostgreSQL, DB2, etc.), or a non-relational database/NoSQL database (e.g., Redis, Amazon DynamoDB, etc.). In one embodiment, the database may be a distributed database.

The model update system 170 is adapted to update and/or retrain models created by the model creation system 150, including loss metric calibration system 152 and loss metric forecast system 154. The updating may be based on additional historical data and/or an evaluation of the outputs or predictions of the loss metric calibration and forecast systems.

The data clustering system 180 is adapted to perform cluster analysis on the input variables of the historical dataset to determine how the data is clustered. After the historical dataset has been clustered, separate prediction models, e.g., loss metric calibration models and loss metric forecast models, may be trained for each cluster according to the methods disclosed herein.

Figure 2:
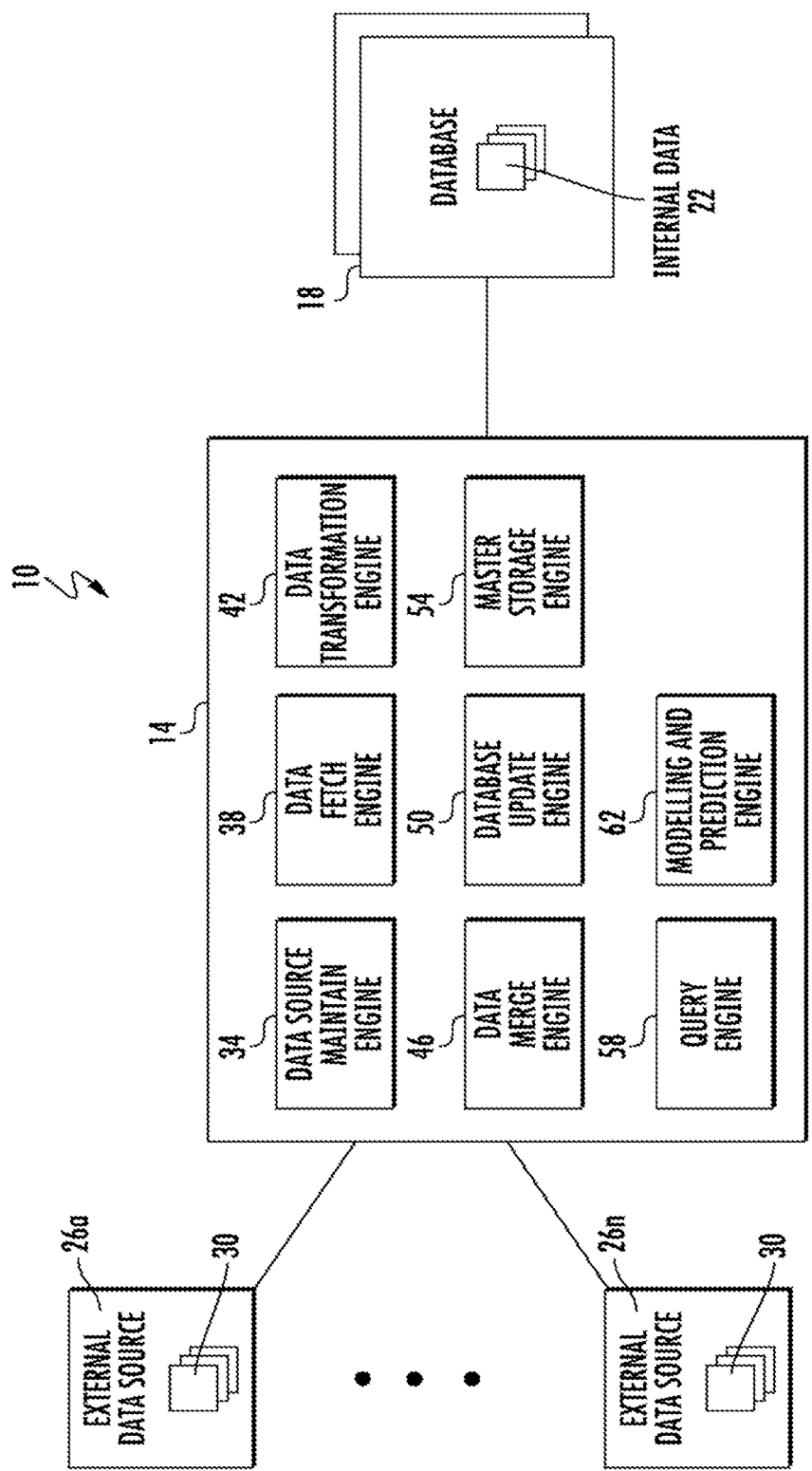
FIG. 2 is a schematic illustration of one example of a database system.

FIG. 2 is a schematic illustration of one example of a database system 120. As is illustrated, the database system 120 may include a database management system 14, one or more databases 18 storing internal data 22, and one or more external data sources 26 storing external data 30. According to one example, the database management system 14 may retrieve external data 30 from the external data source(s) 26, transform the external data 30 into a format compatible with the database 18 and/or the internal data 22, and then merge the external data 30 into the database 18 with the internal data 22, as described in U.S. patent application Ser. No. 16/146,590, which is hereby incorporated by reference in its entirety.

As is illustrated in FIG. 2, the database system 120 includes the database management system 14, which may interact with external data sources 26 and database 18 in order to add data to the database 18, and also to search for data within the database 18. The database management system 14 may be software, hardware, or a combination of the preceding. Database management system 14 may include a data source maintain engine 34, a data fetch engine 38, a data transformation engine 42, a data merge engine 46, a database update engine 50, a master storage engine 54, a query engine 58, and a modelling and prediction engine 62. Furthermore, the database management system 14 may include further engines and components, some of which are discussed further herein.

The data source maintain engine 34 may store the location of the external data sources 26, may store the location of the external data 30 (e.g., FTP, URL, etc.), may store the history of an external data source 26 (and any changes), may store (and update) a constantly-updated repository of the availability of new or updated external data 30, may store a verification of each external data source 26's file path within the system 10, or any combination of the preceding.

The data fetch engine 38 may retrieve the most recent (i.e., most up-to-date) set of the external data 30 from the external data source 26, may ensure that the external data 30 retrieved from a particular external data source 26 is the most up-to-date version of the data, or any combination of the preceding.

The data transformation engine 42 may transform external data 30 to be compatible with the database(s) 18 and/or the internal data 22 stored in the database(s) 18. Examples of this transformation are discussed in detail below. This transformation may ensure that the fetched external data 30 may be merged (e.g., combined, joined, aggregated, etc.) into the database(s) 18, merged with the internal data 22 in the databases 18, and/or merged with other fetched external data 30.

The data merge engine 46 may merge the external data 30 into the database(s) 18 with the internal data 22 to create a "master" database dataset. This merge may be performed based on set of rules (both specified and auto-generated). Also, it may join all internal and external data 22, 30 into a master database dataset on the most granular level available, both spatially and temporally, in some examples. Examples of this merging of external data 30 are discussed in detail in U.S. patent application Ser. No. 16/146,590.

The database update engine 50 may merge all of the different versions of the master database datasets together to keep the database(s) 18 updated. This merging of the different versions may occur continuously, periodically (e.g., every minute, every hour, every day), on demand (e.g., when instructed by a user of database management system 14), or any combination of the preceding. The master storage engine 54 may store, maintain, encrypt, back-up, roll-over the database 18 (e.g., the master database dataset in the database 18), or any combination of the preceding.

The query engine 58 may query the database(s) 18 for data. This may allow data to be retrieved from the database(s) 18 for use by the user (e.g., for viewing by a user, to use for making predictions via the modelling and prediction engine 62). The modelling and prediction engine 62 may select one or more models for making a prediction, may train the models, and may produce a prediction (or solution) using a dataset retrieved from the database(s) 18.

As is illustrated in FIG. 2, database system 120 may include one or more databases 18. A database 18 may refer to a collection of information that may be specially organized for search and retrieval by the database management system 14. The database 18 may be stored as a set of files on, for example, magnetic disk or tape, optical disk, or some other secondary storage device. The information in these files may be broken down into records, each of which may consist of one or more fields. The database 18 may be any type of database. For example, the database 18 may be a relational database (e.g., Oracle database, MySQL, Microsoft SQL Server, PostgreSQL, DB2, etc.), or a non-relational database/NoSQL database (e.g., Redis, Amazon DynamoDB, etc.). Database system 120 may include any number of databases 18. Furthermore, the database 18 may be a distributed database.

The database 18 may be connected to the database management system 14 over a communication network (e.g., all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components). This may allow the database management system 14 to communicate with the database(s) 18 to merge data into the database(s) 18, and to retrieve data.

Database 18 may store internal data 22. Internal data 22 refers to internally collected data. For example, the database 18 may be a database utilized by an insurance company. In such an example, the internal data 22 may be data that was internally collected by the insurance company. Although internal data 22 is described above (and herein) as being data associated with insurance, the internal data 22 may be any other data, such as data associated with any other technology or field (e.g., engineering fields, construction fields, legal field, medical field, educational field, etc.).

In some examples, the internal data 22 may be structured data. This structured data may be highly organized data residing in a fixed field within a record or file, such as data contained in relational databases and spreadsheets. As examples, the structured data may be defined by a row/column that organizes the data, a table, semi text (e.g., XML), and/or pre-defined formats.

As is also illustrated in FIG. 2, database system 120 may include one or more external data sources 26 (e.g., external data sources 26a-26n). An external data source 26 may refer to a source of externally collected data. For example, when the database 18 is utilized by an insurance company, the external data source 26 may be a source of data that is collected by any other company, person, or entity that is not the insurance company and/or that is not affiliated with the insurance company. In such an example, the external data source 26 may be an external website, a newspaper, a library, a school, or any other company, person, or entity that is not the insurance company. The external data source 26 may be a computing system (e.g., a computer, a server, a phone), a database, a cache of audio files, any other piece of hardware and/or software that stores data, or any combination of the preceding.

The external data source 26 may be connected to the database management system 14 over a communication network (e.g., all or a portion of the PSTN, a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components). This may allow the database management system 14 to communicate with the external data source 26 to fetch data.

The external data source 26 may store (or otherwise have) external data 30. External data 30 refers to externally collected data. For example, when the database 18 is utilized by an insurance company, the external data 30 may be data that was collected by any other company, person, or entity that is not the insurance company and/or that is not affiliated with the insurance company. Although external data 30 is described above (and herein) as being data associated with insurance, the external data 30 may be any other data, such as data associated with any other technology or field (e.g., engineering fields, construction fields, legal field, medical field, educational field, etc.).

In some examples, the external data 30 may be structured data. In other examples, the external data 30 may be unstructured data (or semi-structured data). This unstructured data may be information that either does not have a pre-defined data model or that is not organized in a pre-defined manner. Examples of unstructured data include images, videos, written or typed text, audio files, etc. Because the external data 30 is unstructured (or semi-structured), it may usually not be compatible with the database 18 (which typically utilizes structured data). As is discussed in more detail in parent application Ser. No. 16/146,590, this external data 30 may be transformed so that it may be merged into the database 18.

In some examples, the external data 30 may be collected, aggregated, and reported by the external data source 26 as data and data attributes in different ways, at different cadences, at different levels of detail, for different geographies, and in different formats. This may result in the external data 30 having a different granularity than the internal data 22 stored in the database 18.

Figure 3:
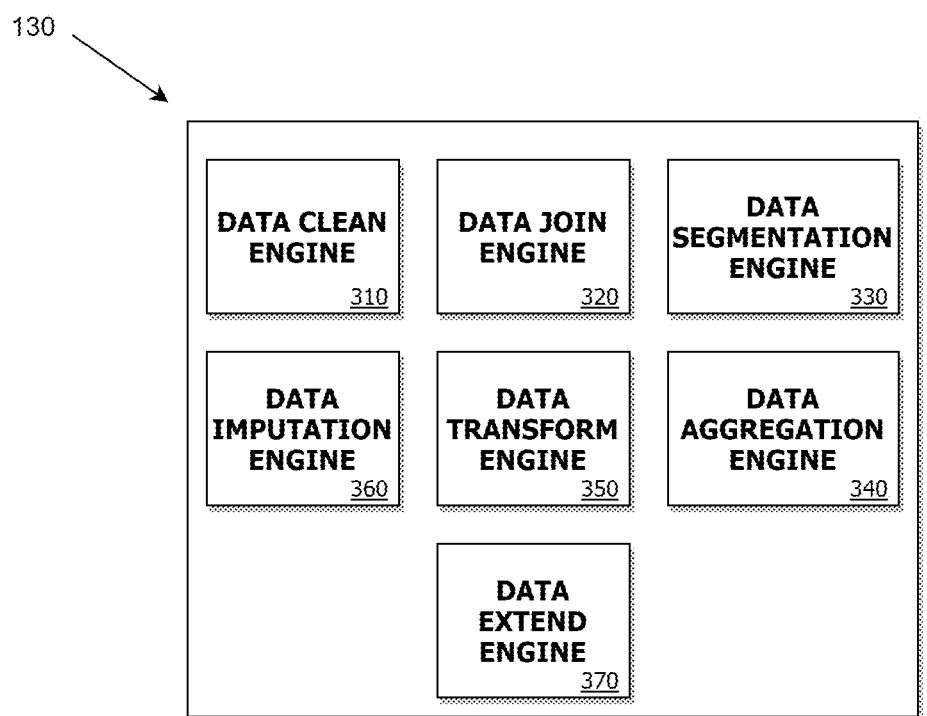
FIG. 3 is a schematic illustration of one example of a data processing system.

FIG. 3 is a schematic illustration of one example of a data processing system 130. As is illustrated, the data processing system 130 may include a data clean engine 310, a data join engine 320, a data segmentation engine 330, a data aggregation engine 340, a data transform engine 350, a data imputation engine 360, and a data extend engine 370. The data processing system 130 and any of its components may be implemented software, hardware, or a combination thereof.

Data clean engine 310 is configured to clean the data, e.g., by standardizing data types and values, removing duplicated variables, removing variables with a unique value, and removing obviously non-predictive variables (e.g., user id, etc.).

Data join engine 320 is configured to join data from various data tables in the database system 120, so data for relevant real world entities (e.g., policyholders), events (e.g., claims), etc., are collected together for easier aggregation by data aggregation engine 340.

Data segmentation engine 330 is configured to segment the data into groups. In one embodiment, e.g., for automobile insurance policies, the data may be segmented based on states, predetermined groupings of states, or other geographical areas as described in more detail herein. Data segmentation engine 330 may also segment the data based on clusters determined by data clustering system 180.

Data aggregation engine 340 is configured to aggregate the data to the desired granularity. The appropriate granularity will depend on the type and structure of the input variables and the target. In the field of auto insurance, an accident-month granularity may be used.

Data transform engine 350 is configured to transform the distribution of any training data where necessary. For example, if the distribution of the target is not a normal distribution, the target data may be transformed to a Gaussian distribution by, e.g., taking the square root of the data points. In general, machine learning models work better with normalized data.

Data imputation engine 360 is configured to add or adjust input data or target data to help train a more stable model. For example, in certain situations (e.g., where the target data is a time series), a data curve may be smoothed using one or more data smoothing techniques. Data extend engine 370 is configured to add a flat tail to certain data, e.g., where the target data is a set of time series data, and the data for some elements of the set ends prior to other elements.

Figure 4:
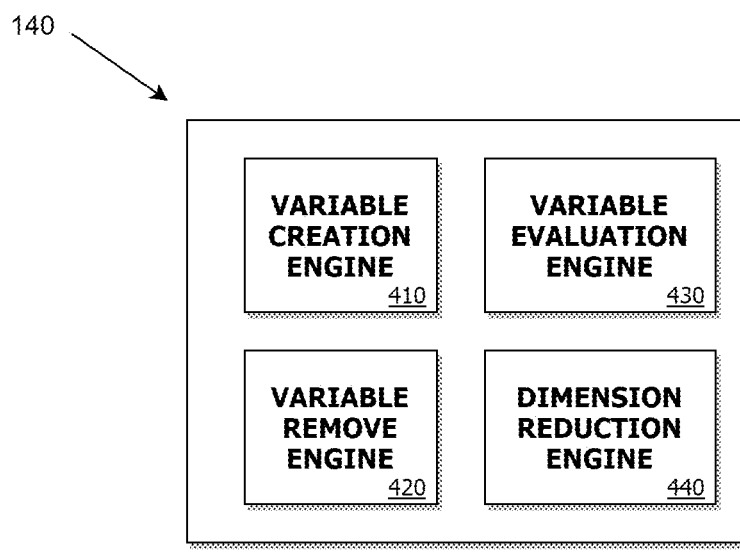
FIG. 4 is a schematic illustration of one example of a feature engineering system.

FIG. 4 is a schematic illustration of one example of a feature engineering system 140. As illustrated, the feature engineering system 140 may include a variable creation engine 410, a variable remove engine 420, a variable evaluation engine 430, and a dimension reduction engine 440. The feature engineering system 140 and any of its components may be implemented software, hardware, or a combination thereof.

Variable creation engine 410 is configured to add additional variables to the data set. Such added variables will generally be based on one or more existing variables in the data set, e.g., combinations of variables, comparisons between variables, modifications of variables, etc. For example, ratio variables, which compare one variable to one or more other variables, may be created.

Variable remove engine 420 is configured to remove variables from the data set. For example, variables with incomplete or sparse data, variables with low variance, highly correlated variables, and noisy variables may be removed from the dataset. Other variables may also be removed, depending on the needs of a particular industry.

Variable evaluation engine 430 is configured to determine the relative contribution of each of the variables in the data set in predicting the target value. In one embodiment, variable evaluation engine 430 may determine this by creating multiple preliminary models using the dataset, and determining the contribution of each of the input variables to the target. In embodiments where the input data is divided between a training data set and a testing or evaluation data set, this evaluation of the input variables in performed only on the training set so the variables input into the model remaining consistent across the training and testing set.

Dimension reduction engine 440 is configured to reduce the dimensionality of the variables of lesser importance, as determined by the variable evaluation engine 430. The dimension reduction may be performed by techniques such as principal component analysis (PCA), singular value decomposition (SVD), or by an autoencoder.

Figure 5:
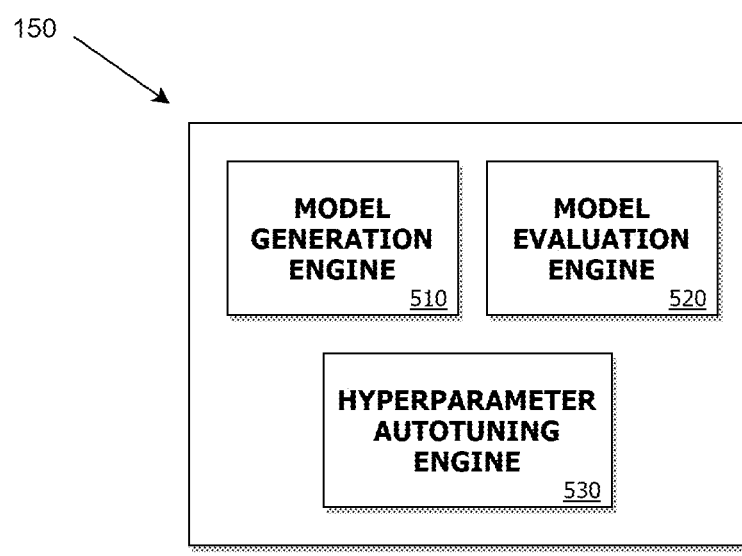
FIG. 5 is a schematic illustration of one example of a model training/creation system.

FIG. 5 is a schematic illustration of one example of a model creation system 150. As illustrated, the model creation system 150 may include a model generation engine 510, a model evaluation engine 520, and a hyperparameter autotuning engine 530. The model creation system 130 and any of its components may be implemented software, hardware, or a combination thereof.

The model generation engine 510 is adapted to generate and train a model based on a provided model type, provided hyperparameters, and a historical data set. Multiple model generation engines 510 may be included in model creation system 150 for use in training different model types, e.g., model generation engines 510 may include a multiple layer perceptron (MLP) model generation engine, a boosted decision tree model generation engine, a kNN model generation engine, a Prophet model generation engine, a long short term memory (LSTM) model generation engine, a convolution neural network (CNN) model generation engine, etc.

The model evaluation engine 520 is adapted to evaluate the accuracy of models created by the model generation engine 510. The methods used to perform the evaluation depend on the type of model created, but generally include a comparison of the expected target (from the historical data) with the target generated by the model. The comparison may be made by using techniques such as MAE (mean absolute error), RMSE (root mean square error), etc.

The hyperparameter autotuning engine 530 is adapted to tune the hyperparameters of the models. The number and type of hyperparameters depend on the type of model. For MLP models, hyperparameters include numbers of layers, size of layers, number of nodes, number of hidden units, activation function, learning rate, momentum, etc. In one embodiment, the hyperparameter autotuning engine 530 may comprise multiple GPUs that generate many variations of a model, each with different hyperparameters. The variations may then be tested (e.g., by the model evaluation engine 520) to determine the best or most acceptable model. The hyperparameter autotuning engine 530 may use the model generation engine(s) 510 and the model evaluation engine 520 for creation and evaluation, respectively, of each variation of the model.

Modifications, additions, or omissions may be made to the above systems without departing from the scope of the disclosure. Furthermore, one or more components of the systems may be separated, combined, and/or eliminated. Additionally, any system may have fewer (or more) components and/or engines. Furthermore, one or more actions performed by a component/engine of a system may be described herein as being performed by the respective system. In such an example, the respective system may be using that particular component/engine to perform the action.

The methods and systems discussed herein may be used with any type of data. For example, the methods and systems discussed herein may be used with data associated with oil production, or data associated with any other technology or field (e.g., engineering fields, construction fields, legal field, medical field, educational field, insurance field etc.). Additional details regarding the use of these methods and systems in the insurance field are included below. These details are provided as an example, and are not limited to the insurance field.

Risk-based pricing requires insurance companies to look into the future to determine how much the company needs to charge customers in order to reach a target profit at both the overall and the individual level, and how to shape demand of desired or undesired customers.

At the aggregate level, the rate maker's job is to ensure that the total premium for all policies written is sufficient to cover the total expected losses and expenses and to provide for the targeted profit. At the individual risk or segment level, Principle 3 of the CAS "Statement of Principles Regarding Property and Casualty Insurance Ratemaking" states "A rate provides for the costs associated with an individual risk transfer." A customer that presents significantly higher risk of loss (whether in loan default, marketing spend required to acquire, or insurable losses) should have a higher price charged than a customer that represents a significantly lower risk of loss.

For example, in insurance the primary component of an insurer's profit equation is the portion of an insurance rate used to cover claims and the costs of adjusting claims, known as loss costs. Loss costs have two primary components: (1) Frequency: the rate at which claims are being made; and (2) Severity: the size of the claim At the aggregate level, companies determine their prices by analyzing future loss costs and adding provision for inflation, expenses, profit, and contingencies. Most state insurance regulators require insurers to file these rate structures and to receive prior approval for every insurance product and coverage the company intends to sell to consumers living in the state. Accurate and defensible projections of loss trends are key components to the regulatory approval process.

At the individual level, premium is calculated based on a given rate per unit of risk exposed, and can vary significantly for risks with different characteristics. Units of risk are determined by rating variables, characteristics which are believed to have statistically relevant correlations to risk. Examples of variables used by auto insurers include where the vehicle is located, driving record, vehicle make, model, and age, prior insurance or gaps in insurance, age, gender, marital status, occupation, and education to name a few. Rates for any given unit of risk exposed are derived by applying a combination of proprietary company business rules, rate tables, and underwriting guidelines that have developed over time to the rating variables.

A more comprehensive basis from which to forecast customer risks at the aggregate level, and from which to base pricing at the coverage or policy level, is required to improve the efficiency and accuracy of targeting, acquiring, pricing, and servicing customers. Data is at the core of this more comprehensive basis.

Specifically, the methods and systems described herein provide a more comprehensive accounting of both the particular and the fundamental components of risk, which is defined herein as risks with outcomes that can be measured in financial terms. A more comprehensive accounting of the components of risk, in turn, requires a broader and more detailed set of descriptive attributes, and a more granular measurement of and accounting for these attributes in both time and space.

As an example, during the insurance application process, companies tend to collect the minimum data required to quote, bind, and issue the policy, henceforth referred to herein as the "application process," with data referred to herein as "internal data." The depth and breadth of this internal data will vary depending on the state in which the policy is issued, the channel through which it is bought or sold, and the coverage(s) being purchased. Regardless of company, coverage, channel, and State of issuance, the type of policyholder attributes collected during the application process typically include, but are not limited to: (1) Basic personal identifying information, such as name, address, contact information, and Social Security Number (SSN), gender, and birth date; and (2) Basic demographic attributes such as marital status, occupation, and income.

The data collected relating to the insured risk, whether property (any asset) or casualty (any liability) will vary by coverage, by State, and by issuing company. Examples of the types of data collected during the application process include, but are not limited to, the following. In auto insurance, the data collected may include vehicle data (e.g., Make, Model, Year, Ownership: lease or own, Use—business or personal, Vehicle features: Anti-theft deterrents, accident avoidance, other vehicle safety features), driving behavior (e.g., annual miles driven, accident history, moving violations history), household data (e.g., number and ages of licensed drivers, number of insured vehicles), current insurance carrier and history (if applicable). In homeowner insurance, the data collected may include: structure location; structure attributes (e.g., structure type/use, construction year, construction quality, square footage); assessed tax value; estimated replacement cost; age and condition of key systems and/or components such as plumbing, electrical, and roof); and presence of risk factors such as animals with bite history, pools, trampolines, and presence or absence of gates, fencing, controlled access, etc.

Internal data collected during the application process and occasionally refreshed or updated (either during renewal, during the claims process, offered voluntarily by the policyholder, or proactively requested by the insurance carrier) are only partial descriptions of some elements of the insured risk, but ignore the fact that the risk posed by the insured party, asset, peril, and/or liability are inseparable from the physical environment, local community, and social fabric in which they exist, and with whom they interact every day. Insured risks do not exist in a vacuum; they are subject to dynamic intrinsic and extrinsic environmental, economic, societal, behavioral, and natural forces at all times. Little, if any, of these elements are captured or otherwise accounted for during the ratemaking process, either at the policy-level or the aggregate level for reasons detailed above.

A more comprehensive, detailed, precise, and/or accurate accounting of the intrinsic and extrinsic influencers that contribute to the particular and fundamental components of financial risk require that the insurer's internal data be augmented, which, as described earlier, amount to an accounting of a small number of isolated attributes describing basic personal and property risk. The classes of data used to augment internal data is referred to herein as "external data," while together, the combination of internal and external datasets is herein referred to as the "360-Degree Database." Examples of classes (or categories) of external data components of the 360-Degree Database include, but are not limited to, the following: Geo-Demographic, Geo-Economic, Geospatial, Traffic, Weather, Catastrophes and Natural Disasters, Public Health and Safety, Legal and Regulatory, Societal, Industry Benchmarks, Insured Asset Class data, Insured Party Financial data, and Insured Party Behavioral data. The term "insured party" can represent an individual, a household, a business or other entity.

Figure 7:
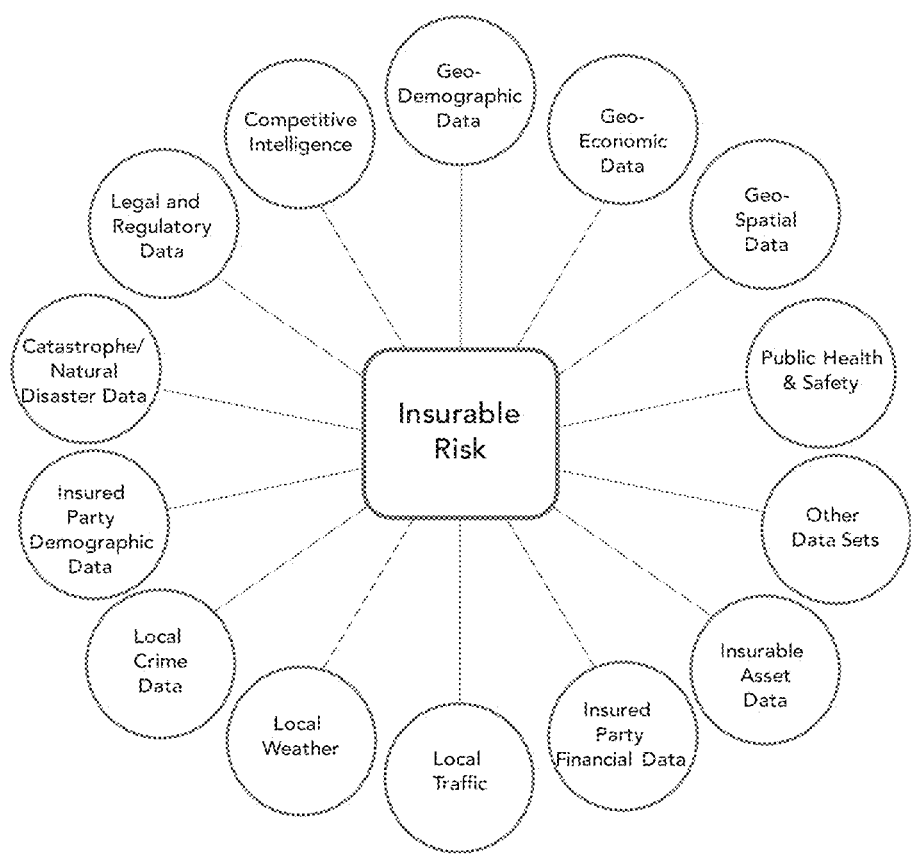
FIG. 7 illustrates types of data that may feed superior assessments of risk in the database.

FIG. 7 provides an example of the kinds of data that may feed superior assessments of risk in the database 120 of FIG. 1. FIGS. 6A-6Q provide additional information regarding examples of data that may be included in the 360-Degree Database. The external data may be retrieved from any of a number of external, third-party databases, from government and industry sources. For example, industry sources such as Acxiom, CoreLogic, Datalogix, etc., can provide specific additional information regarding individuals and households. Government sources, e.g., the Census Bureau, the National Highway Traffic Safety Administration (NHTSA), etc., can provide general demographic, traffic, and accident information for particular geographical regions. Such external can be combined with the internal data for insured parties to provide superior predictions.

Not only can the 360-Degree Database store internal and external data for insured parties, it can also store and/or use any available external information for prospects. Prospects can be divided into two primary categories, those who have interacted with the system in some way (e.g., by requesting an insurance quote, making an inquiry regarding insurance, talking to an insurance agent, having a text chat with an insurance agent, starting to fill out an online application for insurance, etc.), and a broader pool that includes all individuals for which external data exists. Predictions regarding the likelihood of conversion, and the time and/or cost of conversion may be made for prospects using the techniques described herein.

The 360-Degree database enables a finer granularity for both geographic data and temporal data. Insurers required to submit rate structures to State regulators base the structures on state-wide loss-cost projections by coverage, and from time to time, other subcategories including, but not limited to, sales channel. Aggregating risk data and claims experience data at the state level in order to project loss costs and loss trends and create state-specific rate structures ignores vital regional, local, and/or hyper-local differences between and among geographic, demographic, economic, and other distinguishing characteristics. Using the state of Texas as an example, the interior border city of El Paso is different in almost every meaningful way when compared to a major coastal metropolitan city like Houston. Each city represents an entirely different risk profile. A more representative methodology aggregates data at a much finer grain—at minimum, at the Metropolitan Statistical Area (MSA) level, and ideally at the Zip Code Tabulation Area (ZCTA) level. In order of granularity, or degree of refinement, from least detailed to most detailed, includes but is not limited to the following: Metropolitan Statistical Area, Micropolitan Statistical Area, Combined Statistical Area, Core-Based Statistical Area, Zip Code Tabulation Area, and Exact Latitude/Longitude.

Generally, any exposure, defined herein as the intrinsic and extrinsic factors pertaining to any financial risk, that subject that risk to loss from some hazard or contingency, are not only localized, but also vary significantly from day to day, even hour to hour. Morning rush hour commuters face very different risks than do midnight shift workers on their daily commutes to work. The risk to both is different on a typical Sunday than on a typical Monday. Likewise, any structure's exposure to the risk of fire is different on July $4^{th}$ than on most other days during the year. Residents in New York state's lake-effect snow belt contend with much different seasonal driving conditions than do residents of Manhattan. As such, values for each internal and external data attribute must be accounted for on at minimum a daily basis. More granular temporal designations—hourly, for instance, or in some cases, in real time, are possible and preferable in cases including but not limited to local weather events, local traffic flow, and local traffic congestion metrics.

To best use the additional data gathered by the system, more detailed models need to be created that take into account the additional data. To this end, the disclosed systems and methods can generate one or more classifications models and/or regression models, including, but not limited to, perceptrons, logistic regression, feedforward neural networks (i.e., multilayer perceptrons), recurrent neural networks, deep neural networks (e.g., convolutional neural networks), Markov chains, time series models, state space models, Bayesian models, decision trees, support vector machines, or any other appropriate model. Combinations or ensembles of models, e.g., by bagging, boosting, random forest techniques, etc., may also be used.

The specific heuristics, algorithms, and/or types of neural network to be used for any particular model may be selected based on the type of input data, and/or the historical success of using the heuristics, algorithms, or neural networks with respect to the input data. Any required hyperparameters (e.g., numbers of layers, size of layers, number of nodes, number of hidden units, activation function, learning rate, momentum, etc.), for the heuristics, algorithms, and/or neural networks may be similarly selected.

After the heuristics, algorithms, and/or neural networks are selected, they may be trained based on historical data. Multiple models may be generated and trained, and a best fit model may be selected from the multiple trained models to be used.

Figure 8:
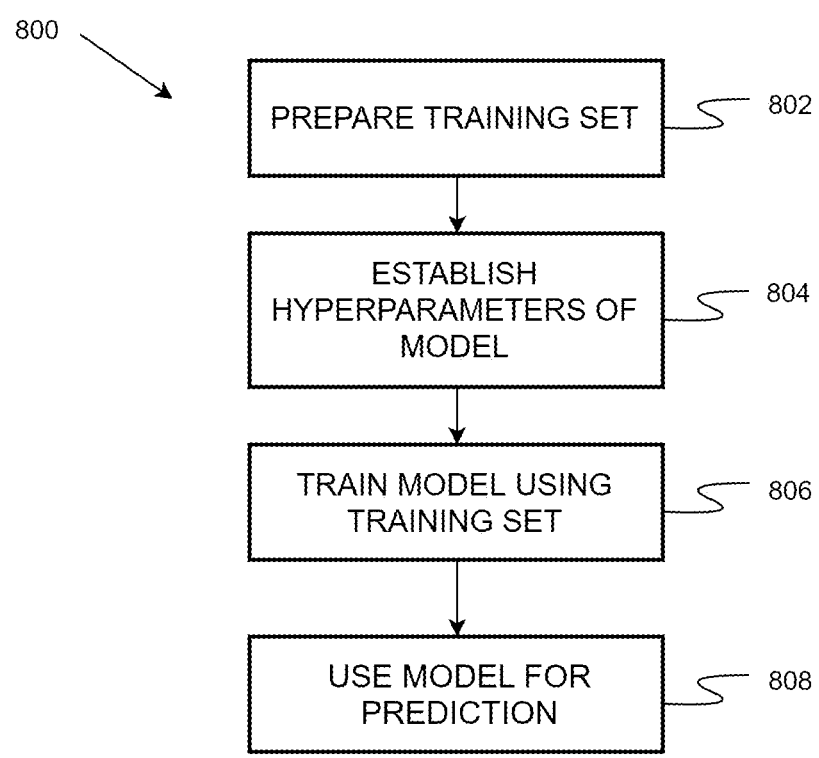
FIG. 8 illustrates an example method for model creation.

FIG. 8 illustrates an example method 800 for generating a model, that may be used, e.g., by model creation system 150. In this example, a neural network model is being created, though other types of models may be used. In step 802, historical data is used to prepare training sets. Each training set may comprise one or more input data points and target data point, both from the historical data.

In step 804, the hyperparameters of the model can be established, including the number of layers and neurons, the number of epochs (e.g., complete passes through the training set), optimizations, error functions, etc.

In step 806, the model may be trained using the training set prepared in step 802.

In step 808, the model may be used for prediction.

Figure 9:
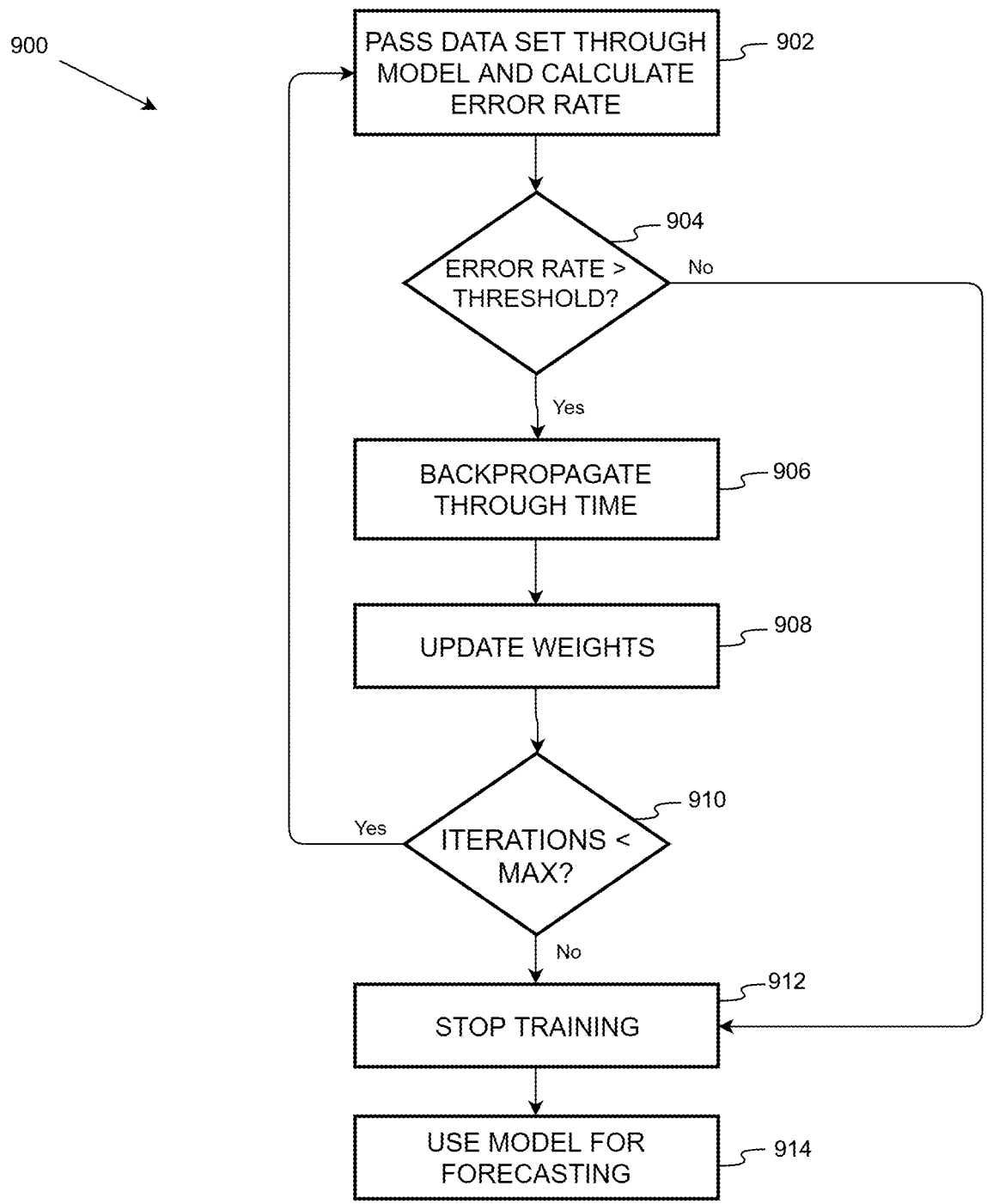
FIG. 9 illustrates an example method for training of a neural network model.

FIG. 9 illustrates one embodiment 900 of training a model (see FIG. 8 at step 806). In step 902, the data set is passed through the model, and an error rate as compared to a target output is determined.

In step 904, the error rate is compared to a threshold. If the error rate is not less than (i.e., greater than) the threshold, backpropagation through time may be used to calculate gradients for the connections between the neurons, as illustrated at step 906. In step 908, weights within the neural network can be updated based on the calculated gradients.

In step 910, the number of iterations is compared to a maximum number (e.g., the predetermined number of epochs), and if it has not been reached, the method returns to step 902 to perform another training iteration. Once the maximum number of iterations has been hit or the error threshold has been achieved, the training can stop in step 912, and the model can then be used for prediction, as illustrated at step 914.

The inputs used for the model may be determined by one or more data analysis methods, such as identifying input variables that influence the desired output, identifying input variables that influence other input variables, etc.

In an embodiment, internal data and external data may be combined together to train a model to be used in insurance ratemaking. Generalized Linear Models (GLMs) are widely recognized as the standard method across industries for rating and underwriting prospect and customer risk in most developed markets worldwide.

The goal of GLMs is to express the relationship between an observed response variable (Y) and a limited number of predictors (X), and is traditionally expressed as:

$$E[Y]=g^{-1}(a_0+a_1X_1+\ldots+a_nX_n)$$

where (g) is the link function, expressing the relationship between random and systematic components.

However, projecting risk at the aggregate level with GLMs is cumbersome, the statistical models utilized are limited and inflexible, and the number and type of potential predictive data elements available for analysis is severely restricted.

The foundation of any GLM model is a complex web interrelated assumptions. GLMs rely on explicit assumptions about the underlying distributions (mean and variance) of each parameter (Norma, Poisson, Gamma, Binomial, Inverse Gaussian, Negative Binomial, Tweedie, etc.) and the nature of the relationship between and among possible predictive variables. Reality is rarely so neat and orderly. Any single assumption that does not hold invalidates all results.

The number of explanatory predictors (rating variables) GLM models can accommodate are limited in number and format. GLMs do not provide a system for finding all relevant interactions, and it is not practical for companies to test all extant combinations of three-way interactions, let alone interactions involving four, five, or more predictors, by trail-and-error.

GLMs rely on limited categories of linear models. Real-world phenomena are distinctly non-linear.

The quality of the models and the veracity of their output relies heavily on the skill of the user. Troubleshooting inconsistencies requires users to deconstruct layer upon layer of interrelated assumptions, which is difficult, time consuming, and prone to errors and oversights. Adjustments often have unintended downstream consequences.

GLMs are used to produce state-level filings that aim to be right in the aggregate, on average, over time. Business strategies based on coverage-level cost projections for an entire state a year in advance impede the agility required to react to changing market conditions, while the lack of pricing precision restricts the carrier's ability to micro-target high-value market segments. Further, pricing inefficiency practically guarantees that the company underwrites risk they do not want.

One of the most significant underpinnings of the risk underwriting process is access to data. At the individual level, the accuracy of these judgements depends upon the depth, breadth, and quality of rating variables available on hand.

For example, Insurance companies select rating variables because they are statistically correlated with risk. Of course, correlations are extremely common in every walk of life, may be the result of hidden or missing variables, and do not imply causation.

Too narrow in scope: The characteristics that determine risk are often highly localized, varying from place to place and from day to day. Current ratemaking practices often ignore entire classes local geo-demographic, socioeconomic, and climatological factors that shape the environmental component of risk. Additionally, companies select rating variables because they are statistically correlated with risk. Of course, correlations are extremely common in every walk of life, may be the result of hidden or missing variables, and do not imply causation.

Too narrow in breadth: Risk underwriting variables are subject to a "Catch 22"—the variables utilized to classify risk are limited by data that has been historically collected. Because there is a cost to collecting, maintaining, and storing data, companies maintain only that data which have historically been utilized in statistical modeling—limited in both scope and format. The absence of entire classes of data impairs current risk rating processes from accurately reflecting risk.

The inability to integrate unstructured data into linear statistical models will put even more distance between legacy ratemaking processes and reality. Photographs from accident sites and adjusters in the field, written police reports, video footage from traffic cameras or satellites, and recorded audio from customer-carrier interactions are just a few examples of valuable data that cannot be integrated into current statistical ratemaking processes.

Infrequently refreshed: Absent a claim, insurance companies will not typically interact with their policyholders during the term of the policy. While factors contributing to any risk can be dynamic and fluid, and, in the event of influencers like local weather, can change minute to minute, the limited data insurance companies rely on is often self-reported by applicants, difficult to verify, and updated infrequently.

In summary, current ratemaking processes are inefficient at both the aggregate and policy level. Rigid, inflexible, and restricted GLMs rely on dense layers of interrelated assumptions, and force data to comply with models, rather than the other way around; Cost trend forecasts based on limited historical data and manual adjustments are subject to unintended bias, and will always miss inflection points; and Restricting the breadth, depth, and format of rating variable increases the likelihood improperly rating risks. With insurance products and services rapidly commoditizing, efficient, accurate risk assessment is more important than ever.

The application of mathematical, algorithmic, and/or computer science techniques, individually or in some combination (herein referred to as simply "artificial intelligence techniques") in conjunction with the 360-degree database will improve the efficiency and effectiveness of ratemaking for property and casualty insurance policies. Benefits include: (1) Enables the inclusion of orders of magnitude more data attributes in pricing at all levels, for all coverages; (2) Artificial intelligence techniques allow the granular data represented in the 360-degree database to interact naturally, allowing patterns between characteristics and within the data to emerge in ways that are not possible using GLM's or other traditional ratemaking techniques; (3) Does not require users to specify the predictors and interactions to be included in the model (Artificial intelligence, applied to the 360-degree database, will discover them automatically); (4) Multiple responses can be modeled using the same baseline dataset, including loss ratio, pure premium, frequency, severity, profit, retention; (5) Accuracy of output does not depend on the skill of the user; (6) Much faster and more efficient that current methods—pricing, loss cost predictions, and loss trends can be generated in minutes or less, unlike the weeks required with GLMs; (7) Results in pricing at the aggregate coverage, unit, or policy level, as well as pricing for traditional term lengths (typically 6 months or 1 year) as well as usage-based pricing similar in concept to toll roads (pricing by the trip, by the day, by the hour, or some other usage-driven unit.).

Figure 10:
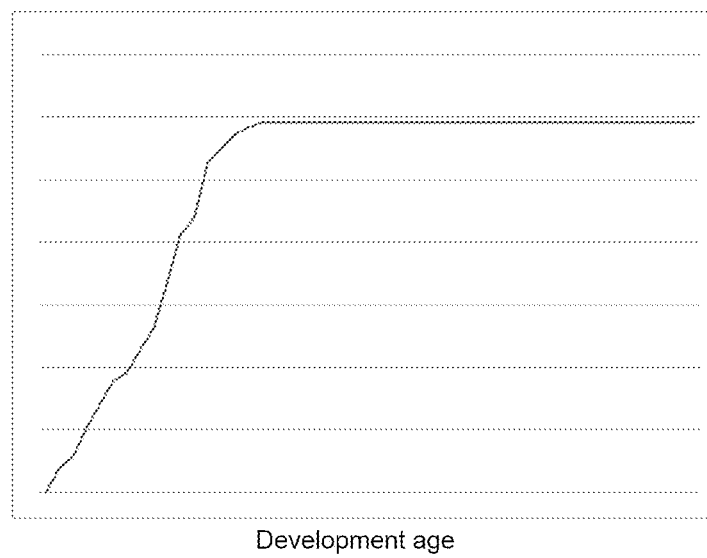
FIG. 10 illustrates an ultimate loss curve for an example claim.

Methods for ratemaking according to the principles of the current inventions are described with respect to FIGS. 10 through 29. FIG. 10 shows a total paid loss curve for an individual claim. The X axis represents the length of time (e.g., months) since the claim was submitted, with X=0 indicating the submission of the claim. The Y axis is the cumulative amount paid on the claim. The graph shows that as time advances, and the claim progresses, the total amount paid on the claim increases, rapidly at first, and then with a slowly increasing tail. For auto insurance policies, a long tail often is the result of claim payouts for bodily injuries sustained during the covered event, e.g., a car accident. The "development age" of a claim refers to the amount of time that has passed since a claim has been submitted. The ultimate loss for an individual claim refers to the total amount that the insurer will ultimately pay out as a result of the claim being filed.

The pure premium is the ultimate loss modified by (e.g., divided by) risk or exposure. The pure premium is generally the portion of the insurance rate that covers expected costs or losses over the life of the insurance policy (as may be modified by rating factors). The pure premium does not include overhead costs, e.g., marketing costs, or profit.

Figure 11:
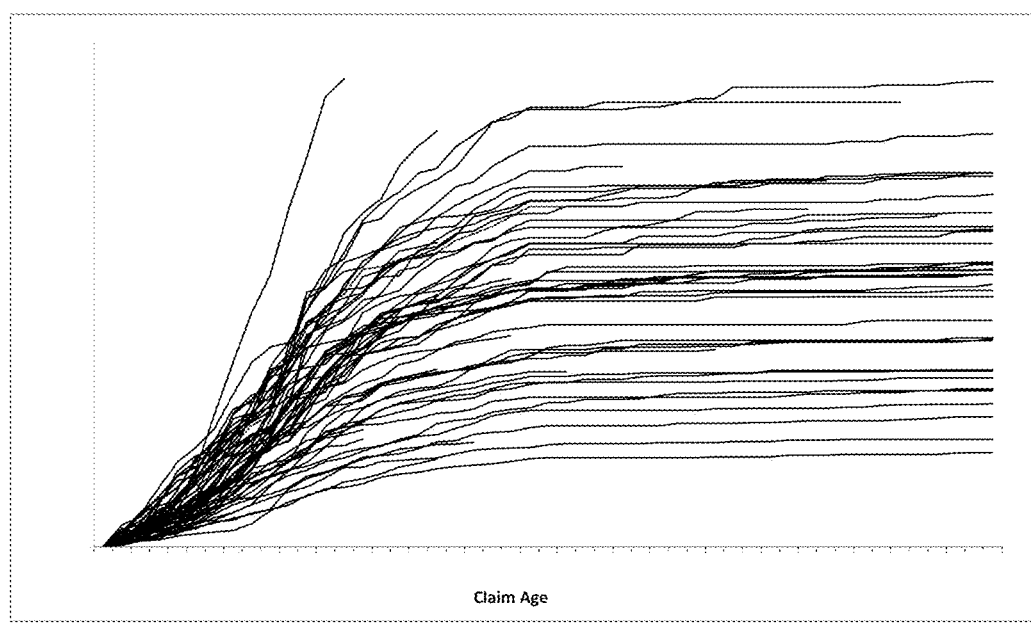
FIG. 11 illustrates ultimate loss curves for a set of claims.

FIG. 11 illustrates a set of claim payout curves. As illustrated, many claim payouts follow a similar pattern: the claim payout increases rapidly for the first few months for payouts on collision and property damage claims, then there is a long tail as bodily injury payouts mature.

Methods are described herein for training a development model to predict the pure premium for an aggregate of claims based on one or more months of existing payout data on the claims. In a preferred embodiment, the claims are aggregated on an accident-month basis, i.e., all accidents that occurred in each month are aggregated together. In other embodiments, claims may be aggregated together on other bases, e.g., bimonthly, biannually, etc.

The development model may alternatively be trained to predict the ultimate loss or another loss metric (e.g., total paid loss, case incurred loss, etc.) instead of the pure premium.

In addition to predicting the pure premium, the development model may be trained to predict the full development curve, e.g., the pure premium/total paid loss at each development age, of the aggregated claims.

In an embodiment, a separate model may be trained to make a pure premium forecast based on a time series of historical pure premium amounts and other input data. The forecast model may be used to forecast future pure premiums based on both fully realized claim payouts and pure premiums for claims as predicted by the development model.

Figure 12:
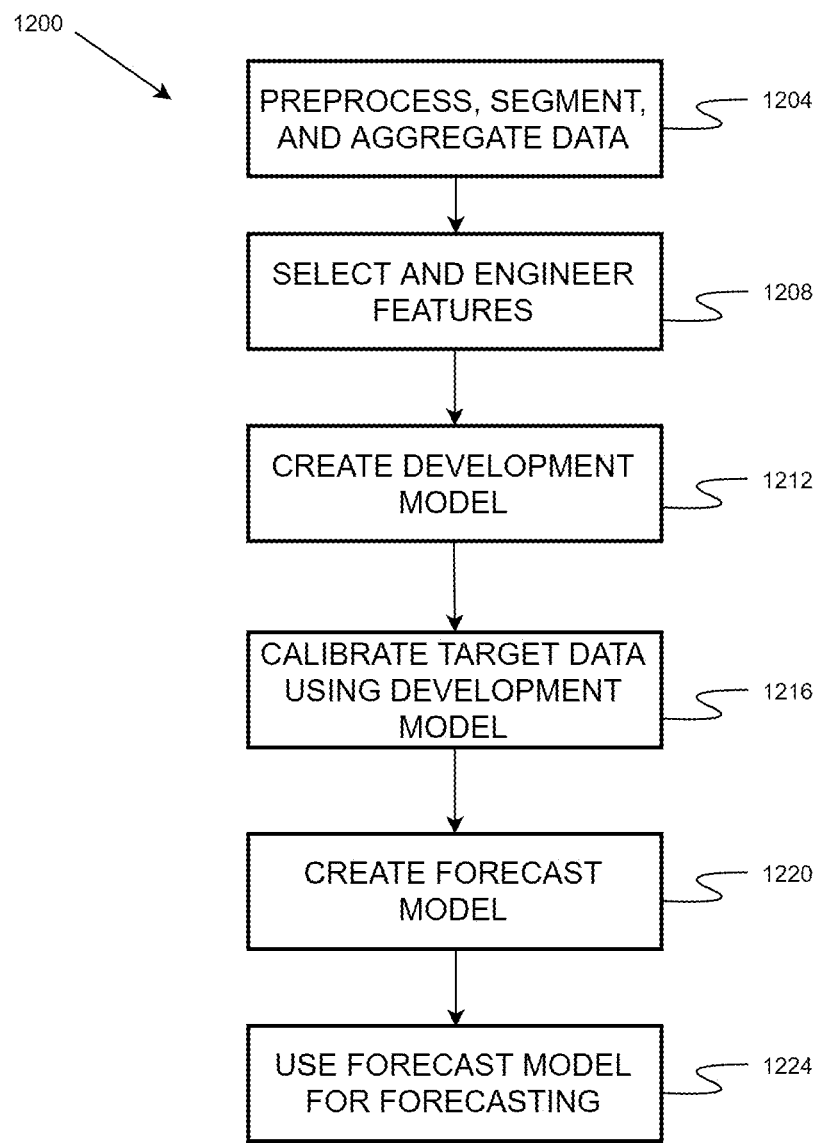
FIG. 12 illustrates an example method for ratemaking.

A method 1200 for ratemaking is illustrated in FIG. 12. In step 1204, the historical data, including input variables and the target (pure premium), is segmented, preprocessed, and aggregated.

The data is segmented according to states, state groups, or other geographical regions. The data is aggregated to the accident-month level. An accident-month refers to the aggregate data for all of the accidents that occurred in a particular month, e.g., the accidents that occurred in August 2019.

The input data comprises the input variables at each development age for each of the accident months. The targets are the respective pure premiums at each development age for each of the accident months.

The input data comprises thousands of variables relating to the policyholder, drivers, vehicles, claims, and external environment. The policyholder variables may include the data categories listed in FIGS. 6K, 6L, 6N, 6O, 6P, and 6Q (e.g., personal data, financial data, asset data, policy data, claim history data, etc.). The driver variables may include the data categories listed in FIG. 6K. The vehicle variables may include the data categories listed in FIG. 6M. As the model is designed to predict bodily injury claim development, only policyholder, driver, and vehicle data for bodily injury policies is included in the input data.

Policyholder variables may also include policy deductibles, policy discounts, policy limits, premium development history, vehicle and driver counts, household violation or incident history, and the policyholder credit score or other information regarding policyholder's financial status or history.

The claim variables may include all information relating to BI claims, e.g., identity of the claimant and the insured, claim status, incident data (e.g., accident time and location, accident type, history, details (e.g., existence and identity of witness, weather, traffic, etc.), attributes (e.g., whether seat belt was being used, etc.), etc.), claim history, adjustor notes (e.g., vehicle damage information, vehicle speed, speed limit, police report information, etc.), claim payouts, information regarding any medical evaluation of the injured party, submitted medical bills, and any other information relevant to the incident, the claim, and/or the medical care of any injured party.

In addition to BI claims, information regarding collision and property damage claims may be collected and included in the input data, as collision and property damage claims may be predictive of and/or otherwise relevant to future bodily injury payouts for the BI claims. Other claim data may be relevant to BI claims, and included in the dataset, such as no fault claim data, personal injury protection claim data, medpay claim data, uninsured motorist claim data, underinsured motorist claim data, and/or comprehensive claim data.

The external variables may include the external data categories listed in FIGS. 6A through 6Q (e.g., geo-demographic, geo-economic, traffic, traffic incidents, weather, severe weather, catastrophes, public safety, public health, regulatory, industry benchmarking, social and behavioral, consumer financial, vehicle history, assets, etc.). The external data may be received or retrieved from external data sources 26, which may comprise any store of the described types of external data.

External weather data may also include atmospheric pressure, cloud type, dew point, solar zenith angle, DNI (direct normal irradiance), DHI (diffuse horizontal irradiance), GHI (global horizontal irradiance), clearsky DNI, clearsky DHI, clearsky GHI, and other measurements of solar radiation.

External traffic data may also include statistical data (e.g., traffic volume trends) compiled by the Office of Highway Policy Information (part of the FHWA) and traffic fatality data compiled by the National Highway Traffic Safety Administration. The traffic fatality data may include detailed information about each incident, e.g., time, location, location description (e.g., information about where the incident occurred), the atmospheric conditions, incident information (e.g., number of people and vehicles involved, whether safety devices (e.g., seatbelts, air bags, helmets) were used/deployed, number of fatalities, type of collision, seating position of occupants, extent of damage (including any fire damage), types of hazardous materials involved (if any), if incident was a hit-and-run, whether incident was holiday related, details regarding the incident progression (e.g., events pre-collision, sequence of events during collision, etc.), vehicle rollover information, occupant ejection information, etc.), vehicle information (e.g., make, model, year, body type, etc.), driver information (e.g., height, weight, race, sex, age, prior infractions or accidents, license status and type, prior license suspensions, etc.), outcome information (e.g., arrive time of EMS, time of death, etc.), contributing factors (e.g., driver distractions, vision obstructions, driver impairment factors (e.g., alcohol, drugs, etc.), avoidance maneuvers, vehicle speed), etc.

External geo-demographic data may also include data regarding employment rates for males and females 16 and older, data regarding health insurance coverage, and census data (e.g., household data, school enrollment, educational attainment, veteran status, disability status, place of birth, citizenship status, language spoken at home, ancestry, etc.).

The external variables may also include data regarding fuel prices of different fuel formulations in region of the country, states, cities, or other geographical areas.

The external data may be collected on specified time and geographic granularities. For example, weather data may be collected on a time granularity of daily, and a geographic granularity of zip code. Possible time granularities include quarter-hourly, hourly, daily, weekly, monthly, quarterly, annually, etc. Possible geographic granularities include states, groups of states, and other geographic regions as described in more detail elsewhere herein.

In step 1208, feature selection is performed on the input variables to reduce the number of input variables from thousands to several hundred, while maintaining the overall signal of the data. In one embodiment, multiple test models are created using the input data, and the input variables with the most effect on the target are selected, e.g., in one embodiment between about 100 and about 150 variables are selected. Depending on the data, the top 100-150 variables can account for between about 60% and about 95% of the effect on the target. After the top variables are selected, an autoencoder may be used to consolidate the remaining variables into a smaller number of variables, e.g., about 10 to about 20 variables. This is useful to keep the signal of the remaining variables.

In step 1212, a development model is trained and evaluated using the historical data. The input data for training the model is the set of features determined in step 1208, at each development age for each accident-month. The targets are the pure premiums with respect to BI at each development age for each accident-month. The historical data may be split between training data and testing data.

In general, the development model will be a regression model, and may be trained using a supervised machine learning approach. In an embodiment, the regression model may comprise a multi-layer perceptron (neural network), a tree-based model, such as a gradient boosting model, an LSTM recurrent neural network, a convolutional neural network (CNN), an autoregressive integrated moving average (ARIMA), combinations of the foregoing, etc.

Figure 13:
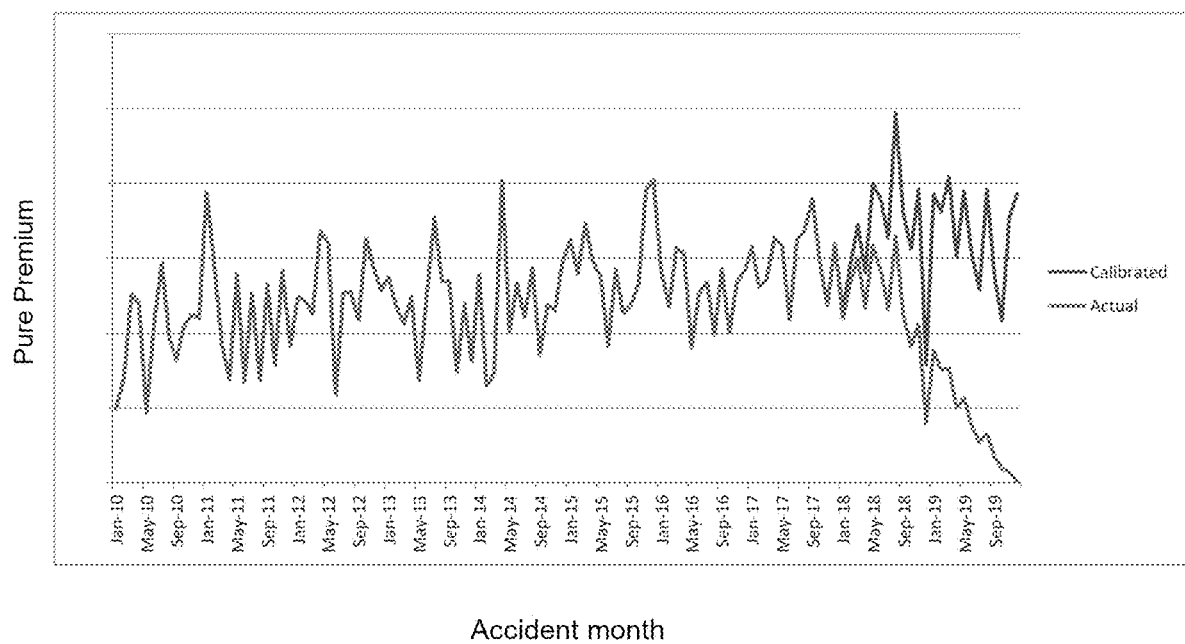
FIG. 13 illustrates calibration of pure premium target data.

In step 1216, for accident-months that are not fully developed, the development curves of the BI claims are predicted (in the aggregate) using the development model. This is to account for future expected payouts for accident months near the end of the training data, where the ultimate loss has yet to be realized. For example, if the training data ends in December 2018, accidents for the entire year of 2018 (and several years earlier) will likely still have expected payouts for bodily injury. As discussed above the bodily injury payouts can add a significant long tail to the payout of a claim. Target data pre- and post-calibration is shown in FIG. 13.

In step 1220, a pure premium forecast model for BI is trained and evaluated using historical pure premium data and pure premiums predicted by the development model for accident months that are not fully realized. In an embodiment, the pure premium forecast model may be any model that can make predictions using a time series of data as inputs, e.g., a Prophet model, a long short term model (LSTM), a regression model, a 1D convolutional neural network (CNN) model, etc.

In step 1224, future pure premiums for BI can be predicted using the forecast model. The forecasted pure premiums can then be used in ratemaking decisions by the insurance company.

Figure 14:
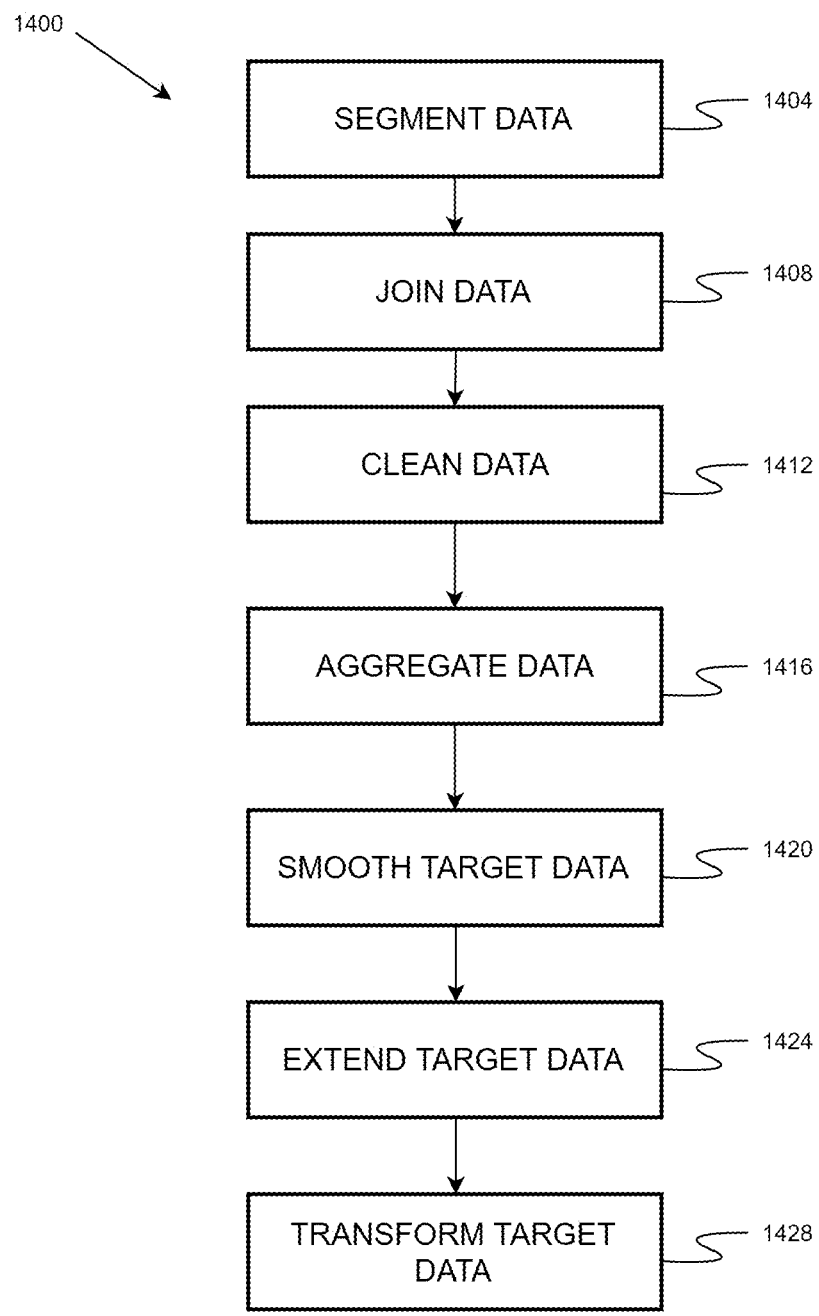
FIG. 14 illustrates an example method for preparing data for training a development model.

Before the historical data is used to train the models, the data is segmented, processed, cleaned, aggregated, and/or otherwise prepared, as illustrated in FIG. 14. In step 1404, the data may be segmented according to states, or other geographical regions as described above (e.g., Metropolitan Statistical Area, Micropolitan Statistical Area, Combined Statistical Area, Core-Based Statistical Area, Zip Code Tabulation Area, etc.). Groups of states or other geographical regions may also be used when there is not enough data for an individual state or geographical region. In embodiments where data is segmented, separate models are created for each segment, using the historical data from the respective segment. In an embodiment, this step is performed by data segmentation engine 330.

In creating segments, groups of states (or other geographic regions) with similar features may be determined, and the data may be segmented accordingly. In one embodiment, the states may be segmented based on historical pure premium data. For example, states with a relatively large portion of historical BI pure premium less than a threshold amount, e.g., $100 (as determined by, e.g., examining a histogram of pure premiums for a specified time period), may be included in one segment, with the remaining states included in the other segment. Multiple segments may be created, with different thresholds at each division point between the segments. Additionally or alternatively, states may be segmented according to insurance rules held in common.

In embodiments where clustering techniques have been applied to the data (see FIG. 27 and related description), the data may alternatively or additionally be segmented based on the determined clusters.

In step 1408, the data may be joined, so that all data related to a common database key is collected together for easier aggregation. The key may abstractly refer to an entity or event in the real world, e.g., an insurance policyholder, an insured vehicle, an insurance claim, etc., that is relevant to the prediction of the target. In embodiments not using a relational database, data related to the real-world entity or event may be collected together in a different manner for easier aggregation. In an embodiment, this step is performed by data join engine 320.

For predicting the development curves of bodily injury, four different datasets may be collected: bodily injury claim data, collision claim data, property damage claim data, and bodily injury policy data. The collision and property damage claim data is relevant to the forecasting of the ultimate loss due to bodily injury. In an embodiment, the joined or collected data may track the evolution of BI policies and/or BI claims over time.

In step 1412, the data is pre-processed and cleaned, e.g., by standardizing data types and values, removing duplicated variables, removing variables with a unique value, and removing obviously non-predictive variables (e.g., user id, etc.). In an embodiment, this step is performed by data clean engine 310.

Variables with incomplete data may also be removed in this step. For example, a variable with data for only 50% of policyholders may be removed. The threshold percentage value may change based on the application, dataset, and model type (e.g., classification vs regression).

In step 1416, the data for each segment is aggregated to the granularity of accident-month. An accident-month refers to the aggregate data for all of the accidents that occurred in a particular month, e.g., the accidents that occurred in August 2019. Alternatively, the data may be aggregated to accident-years or accident-quarters. In an embodiment, this step is performed by data aggregation engine 340.

How each variable is aggregated depends on the type of variable. Numerical variables are aggregated by calculating new statistical variables, e.g., median, mean, min, max, standard deviation, etc. Enumerated variables, i.e. variables that identify a status, indicator, code, etc., are aggregated by counting the number of each type. For example, policyholder marital status may be aggregated by counting the number of policyholders that are married, divorced, separated, never married, etc. In instances where the number of types is large, e.g., ages, the aggregate variables may divide the types into bins. For example, driver ages may be aggregated into variables counting the number of drivers aged 16-23, the number of drivers aged 24-29, the number of drivers aged 30-35, etc. Boolean input variables, e.g., whether a vehicle has a collision avoidance feature, are aggregated into counts of true and false.

BI policy data is aggregated to an accident-month level, and the aggregated policy data reflects the coverage information for that accident-month. Claim data, on the other hand, is aggregated for each development age of each accident-month. For example, if the accident-month to be aggregated is December 2019, then the aggregated policy data reflects coverage information for December 2019. The data for claims filed for accidents occurring in December 2019 ("December 2019 claims"), however, is aggregated for December 2019 and each month thereafter, extending until all December 2019 claims are fully paid. Therefore, the aggregated claim data tracks the monthly BI claim development for each accident-month.

In an embodiment, the BI policy data, BI claim data, collision claim data, and property damage claim data are aggregated separately, then combined together to create a complete internal aggregated dataset. This dataset includes thousands of variables for each accident month, including counts of policyholders, drivers, and insured vehicles; counts of BI claims, BI claim payouts, and other BI claim information; counts of collision and property damage claims, payouts, and other information; and many other aggregations of the variables discussed above with respect to step 1204 of FIG. 12.

The external data is aggregated to match the granularity of the internal data. In embodiments where the internal data is aggregated to an accident-month level, the external data will be time aggregated to a monthly level to create an external dataset. The internal dataset is then joined with the external dataset.

After all of the data is joined or collected, the full dataset contains the policy, policyholder, and claims information for bodily injury, the claims information for collision and property damage, and external information for each state, state group, or other geographical area on a monthly basis.

The target loss metric can be calculated from the aggregated internal data, or may be provided separately. This calculation is done for each development age of each accident-month, to calculate the total paid loss target of each development age of each accident-month. For example, if the target is the total paid loss, it may be calculated by summing the paid loss and expense allocation amounts, and subtracting salvage and subrogation amounts.

In some embodiments, the target data may be smoothed (in step 1420) so as to train more stable models. Smoother data helps by de-noising and clarifying the curve pattern, which is easier for a regression model to learn, and by preventing overfitting the regression model. However, the end point of the curve is fixed, so some traditional smoothing algorithms are unhelpful.

In one embodiment, the data may be smoothed by identifying target data values that lie outside a smooth curve, and using interpolation techniques to calculate new values. For example, if the loss metric stays substantially the same for several months (i.e., the curve is flat), then makes a steep jump, the months after the first may be interpolated upward. Similarly, if the loss metric makes a large jump and then is flat for several months, the point causing the large jump may be interpolated downward.

Figure 15:
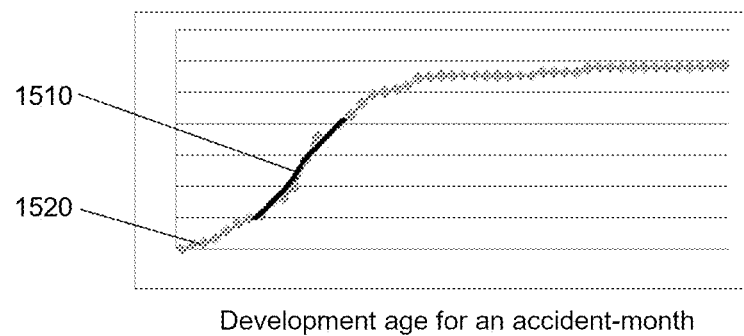
FIG. 15 illustrates imputation of target data.

An example of smoothing of data is shown in FIG. 15. As shown, the development curve of the total paid loss or pure premium for the graphed accident-month prior to smoothing (1520) is more noisy than after smoothing (1510). In an embodiment, this step is performed by data smooth engine 360.

Figure 16:
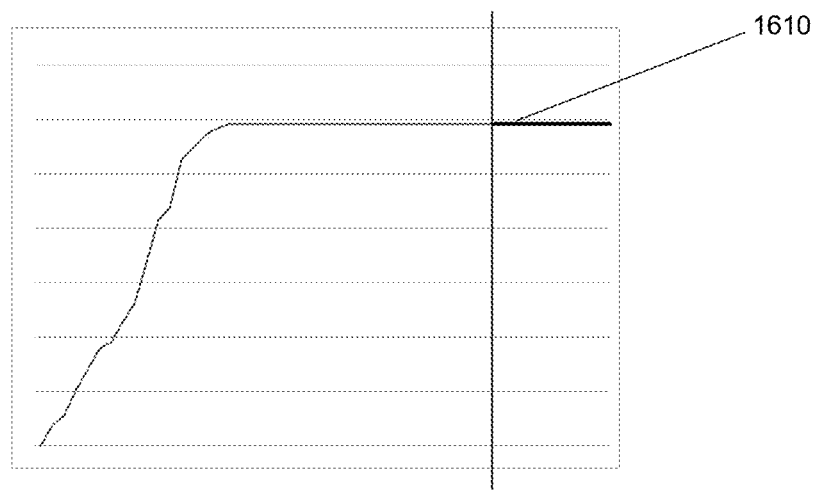
FIG. 16 illustrates extending of target data.
Figure 17:
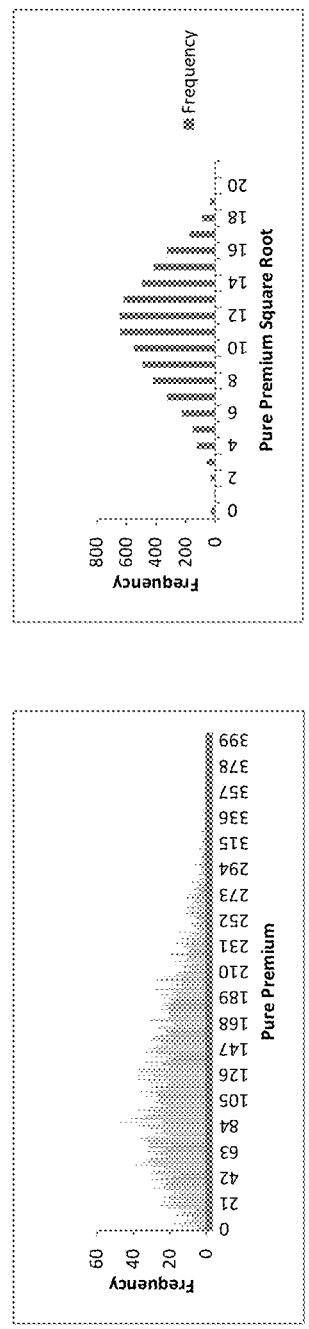
FIG. 17 illustrates transforming of target data.

In some embodiments, the target data for certain accident-months may be extended in step 1424. This is shown in FIG. 16. The aggregate BI claim payouts for a particular accident-month may have been completed prior to other accident-months. In other words, certain aggregated accident-months may have a shorter development period than other aggregated accident-months. In these instances, the claim payout data may be extended to match the other accident-months by adding flat tail 1610. In an embodiment, this step is performed by data extend engine 370.

In some embodiments, the target data may be transformed depending on its distribution in step 1428. Machine learning algorithms perform better when the data has an approximately normal distribution. To take advantage of this, when the data does not have a normal (i.e., Gaussian) distribution, the data may be transformed (e.g., by taking the square (or other) root of the data for data with a left skew, by raising to a power for data with a right skew, by taking the log of the data, etc.) and be converted to a more normal distribution. For example, in FIG. 17, the target data in the left graph is transformed to the right graph by applying the square root to the data. One of ordinary skill in the art will recognize that the data in the right graph (which has also been normalized) has a more normal distribution than the data in the left graph. In an embodiment, this step is performed by data transform engine 350.

Figure 18:
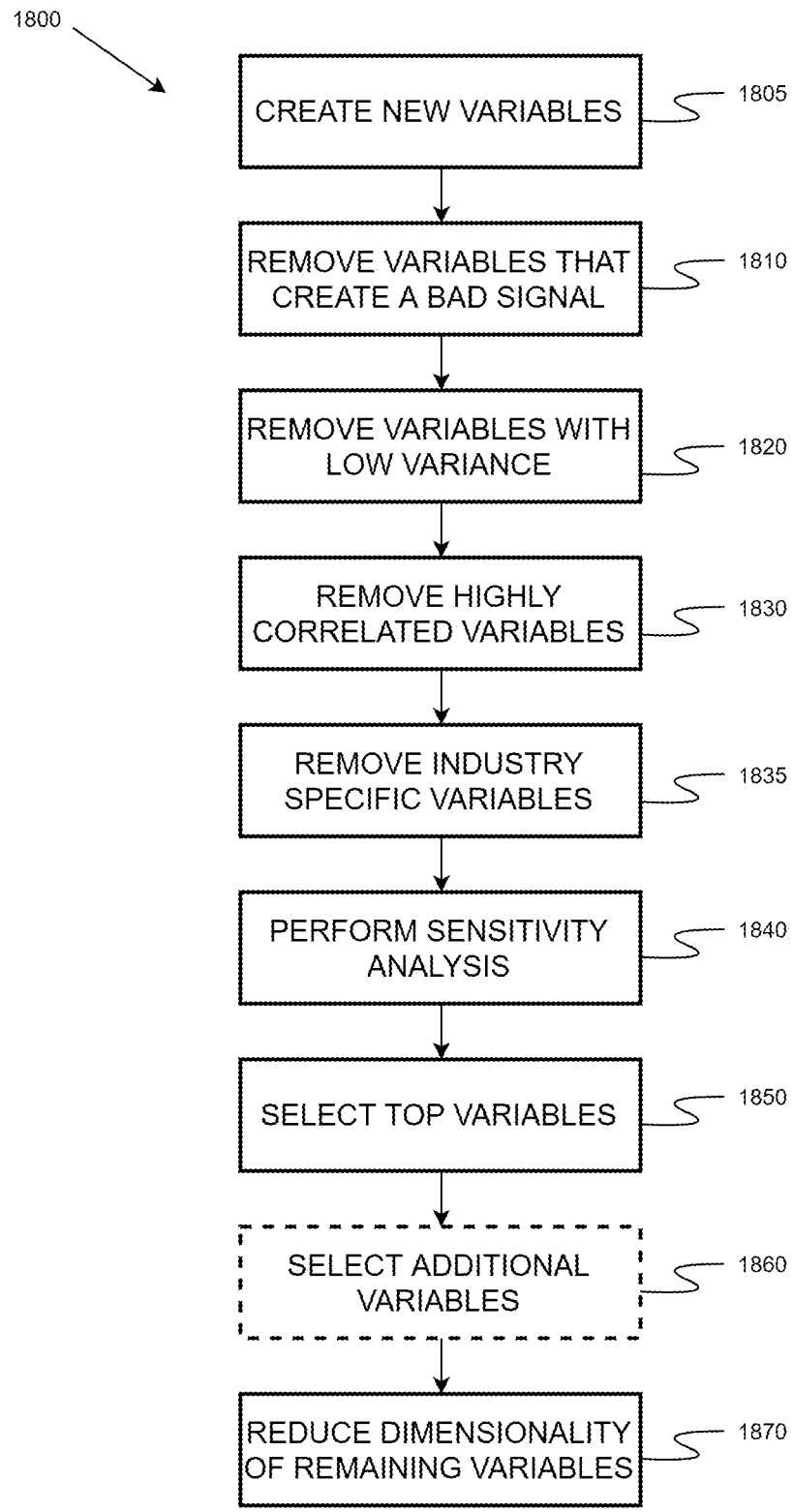
FIG. 18 illustrates an example method for feature engineering.

After the data has been processed, the resulting dataset may include thousands of variables. However, some of the variables may have little or no influence on the target, i.e., do not have a strong 'signal' with respect to the target. Furthermore, some of the variables may be highly correlated with other variables. A method 1800 is illustrated in FIG. 18 to reduce the number of variables to a more manageable amount that can be used in predicting the target loss metric. In embodiments where the data is segmented, the described feature engineering process is performed separately for the data in each segment.

In step 1805, new or additional variables may be created. Such new variables may be ratio variables, which compare one variable to one or more other variables. This step may be performed by variable creation engine 410.

In some embodiments, the aggregated dataset will contain numerous variables that represent counts of real-world items with certain attributes. For example, in the auto insurance industry, the aggregated dataset may contain counts of the number of insured vehicles of certain ages, the number of insured drivers of certain ages, the number of vehicles with certain engine types (e.g., 4-cylinder, 6-cylinder, etc.), the number of insurance policies with certain policy limits, etc. In these embodiments, ratio variables may be created that compare the number of items (e.g., vehicles, insured drivers, etc.) in a category to the total number of items. For example, using the example of vehicle engine types, the ratio of the number of insured 4-cylinder vehicles compared with the total number of insured vehicles may be calculated, and the resulting variable added to the dataset. In some embodiments, all possible ratio variables are created. These ratio variables are created to introduce more information in the input dataset that can capture relationships between variables, the changing of values for variables, and to capture more stable information for incurred but not reported (IBNR) claim payouts for the last several accident-months close to the end of the historical data (e.g., the total number of claims of a certain category may decline near the end of the historical data, but ratio of the number of claims of that category to the total number of claims may be less likely to be affected).

In step 1810, variables that provide an invalid, incorrect, or noisy signal with respect to the target may be removed. FIG. 19 illustrates examples of such variables. As shown, such variables may have large gaps in the data. Such variables may also include variables that are incomplete at the end of the dataset, e.g., time series variables where one or more of the later values haven't been fully calculated. For example, these types of variables may include variables related to costs, some of which have not yet been realized, or related to incurred but not reported (IBRN) expenses. This step may be performed by variable remove engine 420. In some embodiments, this step may be performed by manual inspection of the data, e.g., by using a data visualization package.

In step 1820, variables with low variance may be removed. Variables with unique values (i.e., all of the data is a single value) may be removed. In addition, numerical variables with relative difference between a top and a bottom percentile lower than a threshold may be removed. For example, if the difference between about the 0.25% and about the 99.75% percentile values is less than about 0.02, the variable may be removed. This step may be performed by variable remove engine 420.

Figure 20:
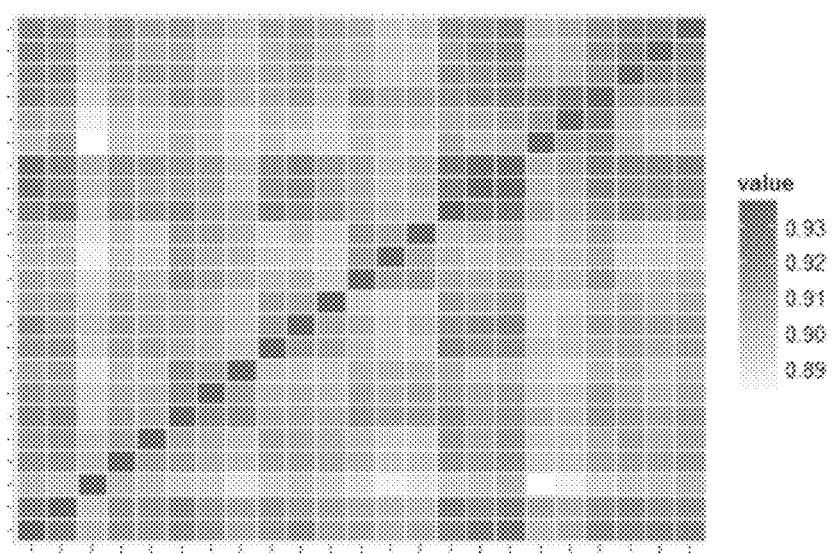
FIG. 20 illustrates a correlation heatmap.

In step 1830, variables that are highly correlated with other variables may be removed. In an example embodiment, variables with a correlation magnitude greater than about 0.95 compared to another variable may be removed. An example correlation heatmap, with the correlation magnitude indicated by the intensity of the pixels, is illustrated in FIG. 20. This step may be performed by variable remove engine 420.

In embodiments directed to particular types of data, as may be present in a particular industry, additional variables may be removed in step 1835. For example, in the auto insurance industry, certain variables related to older driving history may be removed.

In step 1840, a sensitivity analysis is performed on the remaining variables to determine the relative feature importance of the remaining variables on the target. In an embodiment, one or more preliminary models using the remaining variables are created to determine the relative feature importance of the remaining variables. The preliminary models may be any models for which feature importance can be evaluated, e.g., tree-based models, random forest models, gradient boosted models, etc. The preliminary models will use the variables as inputs, with the target being the total paid loss.

In one embodiment the preliminary model or models may use all of the variables as inputs. In an alternative embodiment, variables to be used as inputs may be selected from the remaining variables. After the preliminary model or models are created, the relative important of the input variables can be determined.

Alternatively or additionally, one or more additional methods for determining the most important features with respect to their influence on the target may be used. For example, the Shapley values for each feature may be calculated and used to rank the features. This step may be performed by variable evaluation engine 430.

In step 1850, the top n most important variables, where n can range from about 100 to about 200 depending on the type of model, are selected and added to the feature set. Alternatively, variables with a cumulative importance of a defined threshold, e.g., between about 0.6 and about 0.95, may be selected instead of the top n variables.

As explained in more detail below, n or the cumulative importance threshold may be considered a hyperparameter of the model that can be tuned. This step may be performed by variable evaluation engine 430.

Optionally, in step 1860, an additional number (m) of variables may be selected from the remaining input variables, i.e., the input variables outside of the most important variables selected in step 1850. The number of variables selected may be a tunable hyperparameter. In one embodiment, the m additional variables are randomly selected. In an alternative embodiment, the variables selected may be a tunable hyperparameter.

In embodiments where the input data is divided between a training data set and a testing data set, the evaluation of the input variables performed in steps 1840 through 1860 is performed only on the training set so the variables input to the model remain consistent across the training and testing set.

In step 1870, one or more statistical methods for variable reduction may be applied to the non-selected variables, i.e., the variables other than the variables selected in steps 1850 and 1860. For example, techniques such as random forest, dimensionality reduction, principle component analysis, etc., may be applied to reduce the number of variables. In one embodiment, an autoencoder may be used to extract the features. In one embodiment, between about 10 and about 20 features may be extracted from the non-selected variables for use in the model. The number of extracted features may be a tunable hyperparameter. The trained autoencoder is saved so it can be used on current data.

The selected top n variables, the optionally selected m variables, and the new variables created by dimensionality reduction on the non-selected variables, are then combined into a feature set that is used to train the models. This step may be performed by dimension reduction engine 440.

Figure 21:
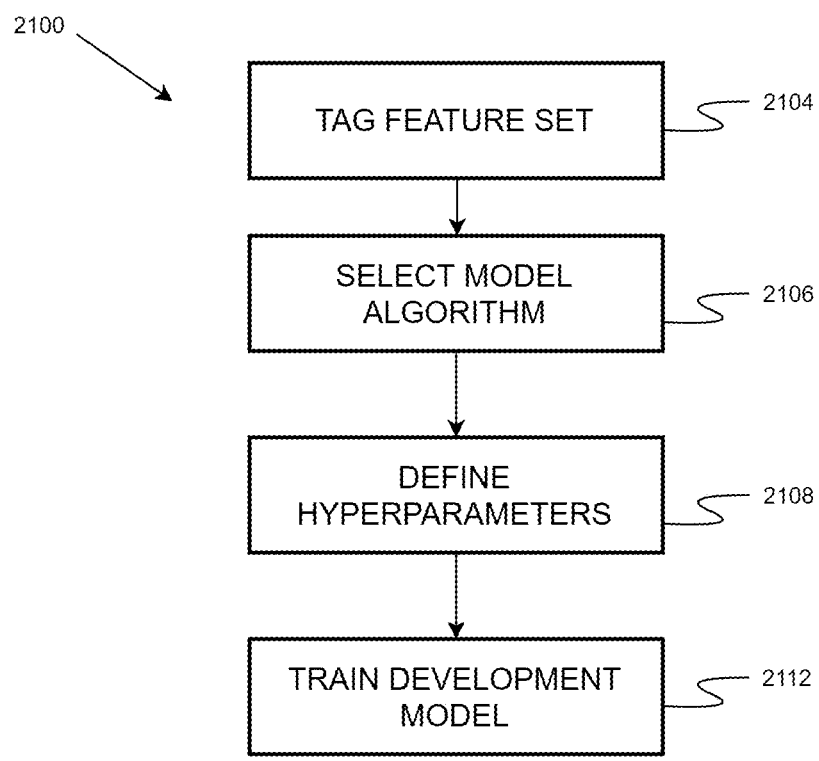
FIG. 21 illustrates an example method for generating a development model.

A method for creating a development model is illustrated in FIG. 21. In embodiments where data is segmented, separate development models may be created for each segment. In step 2104, the feature set created in step 1208 or by the process in FIG. 18 is tagged to prepare for its use in training the neural network. The tagged training data may be divided into one or more sets for training, validation, testing, etc.

The inputs of the training data are the input features for each of the accident months, as determined by the processes described with respect to FIGS. 14 and 18. Additionally, the targeted development age is also input. The targets of the training data are the respective loss metrics for the input accident month and development age of the accident month.

In step 2106, the model algorithm is selected. In general, the model will be a regression model, and may be trained using a supervised machine learning approach. In an embodiment, the regression model may comprise a multi-layer perceptron (neural network), a tree-based gradient boosting model, an LSTM recurrent neural network, a convolutional neural network (CNN), combinations of the foregoing, etc.

In step 2108, the hyperparameters of the development model are defined. For a neural network model, these may include one or more of: the number of layers and neurons, number of units in each layer, the number of epochs (e.g., complete passes through the training set), optimization method(s) (e.g., stochastic gradient descent (SGD), Adam, etc.), error functions, activation function (e.g., sigmoid, RELU, Tanh, etc.), batch size, learning rate, dropout rate, etc.

For a gradient-boosted decision tree, the hyperparameters may include one or more of: tree maximum depth, number of leaves, boosting method, number of iterations, tree learners, feature fraction, number of features, learning rate, maximum number of bins, etc.

In one embodiment, the hyperparameters of the development model may include one or more application-specific parameters. In this context, application-specific is used to indicate parameters not related to the structure of the model (e.g., number of layers, number of nodes per layer, etc.) or the method by which the model is trained (e,g, learning rate, batch size, momentum, etc.). For example, the number of variables selected (n or m) in steps 1850 and 1860 may be a tunable application-specific hyperparameter. The precise variables selected in step 1860 may be a tunable application-specific hyperparameter. The number of features extracted from the non-selected variables is step 1870 may be a tunable application-specific hyperparameter.

In step 2112, the development model is trained using the training set(s) prepared in step 2104, as discussed above with respect to FIG. 9. The development model is then used by the loss metric calibration system 152 to predict pure premium curves, or another loss metric curve.

Figure 28:
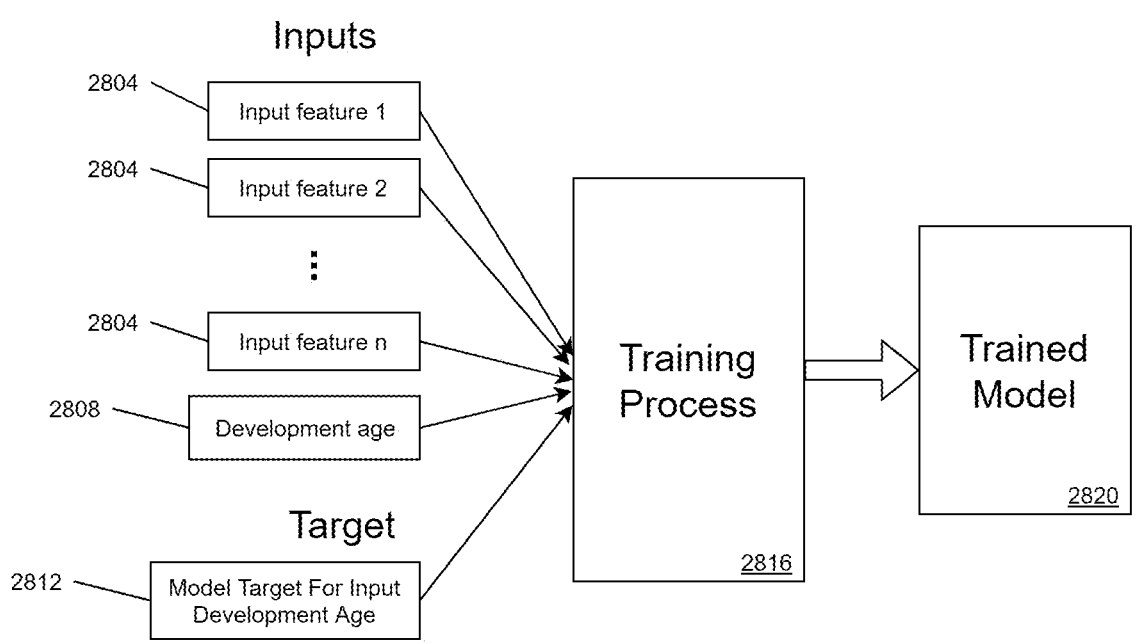
FIG. 28 illustrates an overview of the development model training process.

FIG. 28 illustrates an overview of the development model training process. Input features 2804, input development ages 2808, and targets 2812 are used to train (see 2816) a model 2820. Each instance (e.g., row, if the data can be formatted as rows and columns) of training data includes a) the features for an accident month and b) a development age, where the development age generally runs between 1 and 60 (or higher, if claims take longer than 60 months to fully develop). The target of each instance of training data is a loss metric for the accident month of the input features at the input development age.

Figure 29:
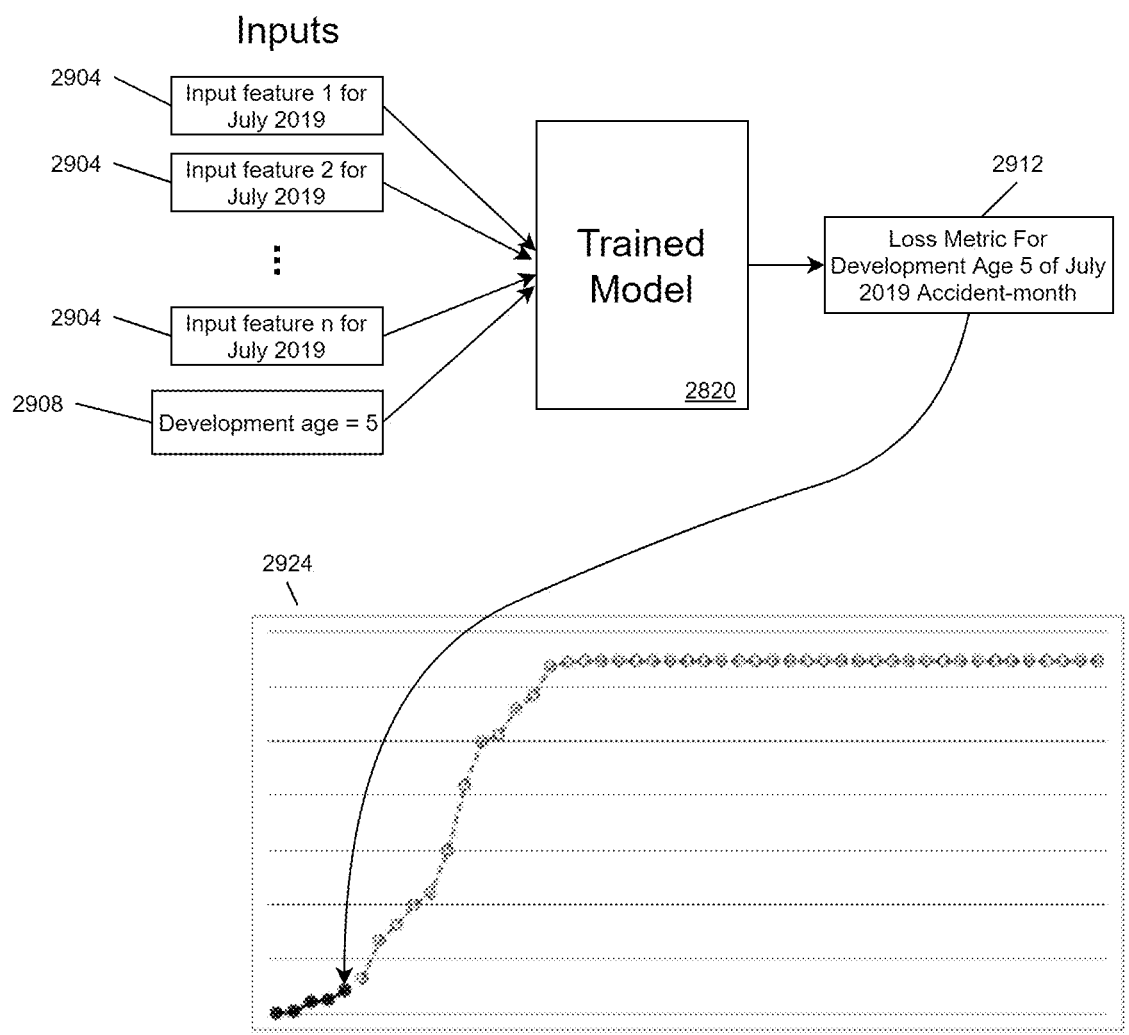
FIG. 29 illustrates an overview of using the trained development model to generate a loss metric prediction.

After the development model for a segment is created, current input feature data 2904 for an accident month, along with the desired development age 2908, may be input into the model 2820 to generate a prediction for the targeted loss metric 2912 for that development age and accident month, as illustrated in FIG. 29. As illustrated, the model 2820 is predicting the total paid loss at development age 5 for the July 2019 accident month, based on the claim data for the first four development ages. Additional development ages beyond development age 5 (indicated by unfilled circles) may also be predicted using claim data for the first four development ages.

To generate the entire loss metric development curve 2924 for an accident month, a series of predictions may be generated by the model, one for each development age of the accident month, using the existing claim data. As more claim data is received, the loss metric predictions may become more accurate, but the present techniques can predict the loss metric for an accident-month quite early in the claim development cycle.

The current data is processed in the same way as the training data, except that no feature engineering is performed. The same features selected during steps 1850 and 1860 of the feature engineering process on the training data are used as inputs during prediction with current data.

After the loss metric development curves for accident months that are not fully developed are predicted using the development model, the future pure premium can be forecasted. The pure premium forecast model takes as inputs a time series of pure premiums for each accident month, either from actual data, or as predicted by the development model. The forecast model can also take as input any of the input data used to train the development model. The target of the forecast model is one or more future pure premiums for accident month(s) in the future.

Figure 22:
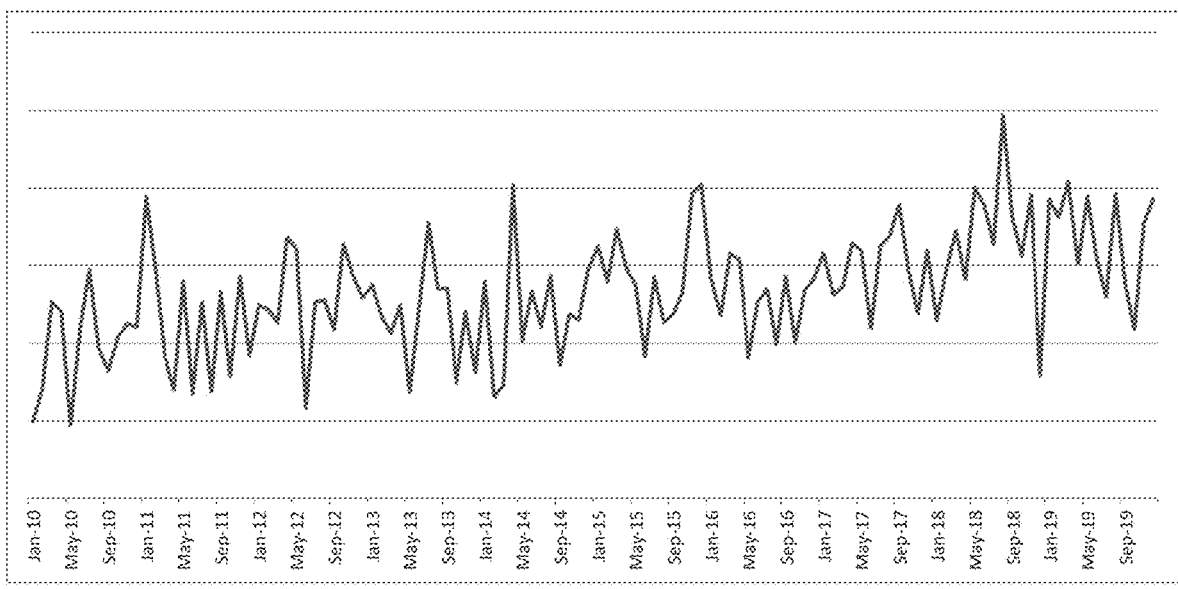
FIG. 22 illustrates example pure premium data.
Figure 23:
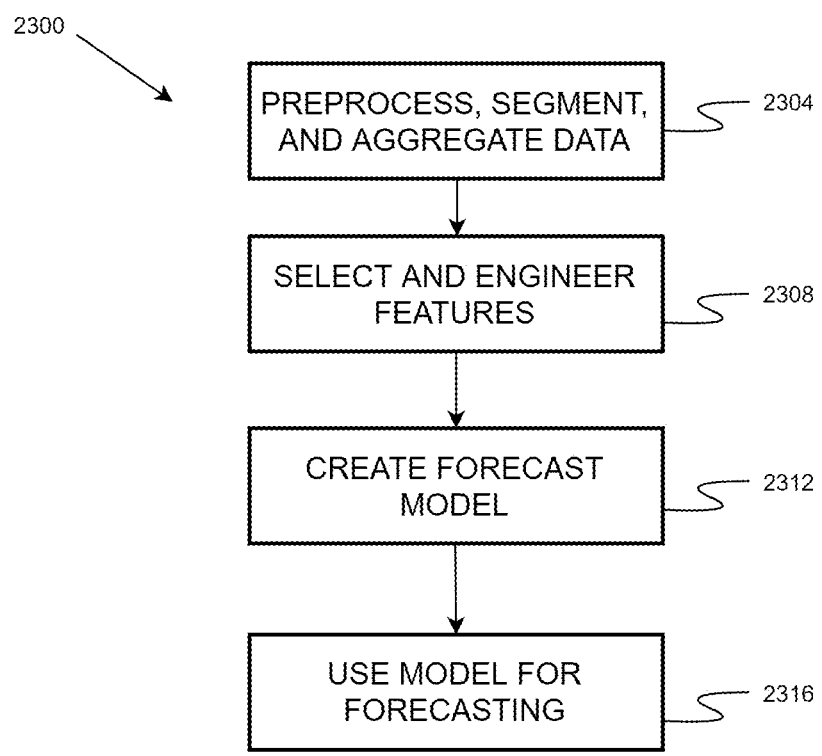
FIG. 23 illustrates an example method for pure premium forecasting.

A method 2300 for forecasting the pure premium is illustrated in FIG. 23. In step 2304, the available historical pure premium data is preprocessed and segmented, if necessary, to generate a feature set. The feature set inputs include the pure premium for the segment and for each accident month in a continuous series of accident months. Example pure premium data is shown in FIG. 22. The target is the pure premium one time step (e.g., month if accident-month is the granularity) in the future.

The feature set used to train the pure premium model may also include any of the input data used to train the development model, e.g., the data prepared in FIG. 14. The importance of input variables on the pure premium forecast may be determined using the feature engineering techniques discussed with respect to FIG. 18.

In one embodiment, the input data may be segmented as discussed above with respect to step 1404 of FIG. 14. Alternatively, a different segmentation scheme may be developed and/or used based on common characteristics of historical pure premium data.

In step 2308, a model is developed for forecasting of the pure premium. In general, the model may be trained using a supervised machine learning approach. In an embodiment, the pure premium model may comprise a multi-layer perceptron (neural network), a tree-based gradient boosting model, an LSTM recurrent neural network, a Prophet model (see https://facebook.github.io/prophet/docs/quick_start.html), a convolutional neural network (CNN), an autoregressive integrated moving average (ARIMA), combinations of the foregoing, etc.

In step 2312, the model created in step 2308 may be used for future pure premium predictions by loss metric forecast system 154.

Figure 24:
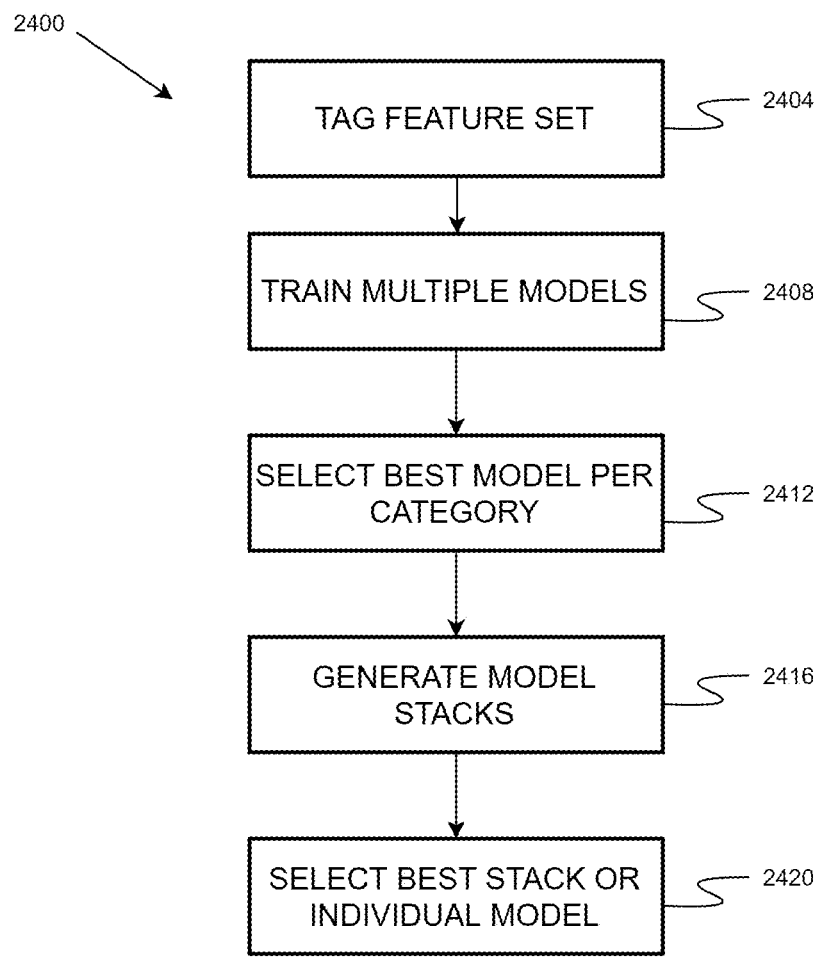
FIG. 24 illustrates an example method for generating a forecast model.

A method 2400 for developing a pure premium forecast model is illustrated in FIG. 24. In step 2404, the feature set created in step 2304 is tagged to prepare for its use in training the model. The tagged training data may be divided into one or more sets for training, validation, testing, etc.

In step 2408, multiple models are trained using the tagged feature set. For example, a Prophet model, a multi-layer perceptron, a tree-based gradient boosting regression model, a vanilla LSTM (with a single hidden LSTM layer), a stacked LSTM (with multiple hidden LSTM layers), a bidirectional LSTM, and a 1D-CNN may be created using the training data.

In step 2412, the best performing model in each category (e.g., prophet, regression (MLP or tree-based model), LSTM, and CNN) is selected. Performance may be determined using an error function (e.g., RMSE, RAE, etc.). In step 2416, the models are stacked in each possible combination, including models individually. In step 2420, the best performing combination is selected using the error function.

For example, multiple prophet models may be generated (e.g., with different hyperparameters), and the best selected. Also, multiple regression models may be generated (e.g., MLP or tree-based models with different hyperparameters) and the best selected. Multiple LSTM models may be generated (e.g., vanilla LSTM, stacked LSTM, bidirectional LSTM, convLSTM, each possibly with different hyperparameters) and the best selected. Then, the best prophet model, the best regression model, the best LSTM model, the stacked combination of the best prophet model and the best regression model, the stacked combination of the best prophet model and the best LSTM model, the stacked combination of the best regression model and the best LSTM model, and the stacked combination of all three best models, may be compared, and the best single model or stacked combination selected.

In any of the embodiments described herein, the hyperparameters may be automatically tuned to generate the model, e.g., by an autotuner. For example, a pipeline may be used that automatically generates a model with a set of hyperparameters, trains the model, and evaluates the model. Other techniques for auto-tuning hyperparameters include random search, grid search, and Bayesian optimization. The models may be evaluated using mean square error (MSE), mean absolute error (MAE), accuracy, precision, recall, etc.

Figure 25:
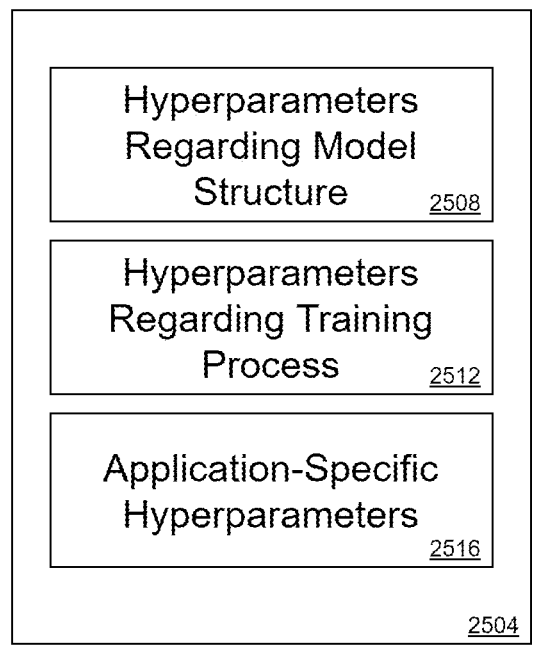
FIG. 25 illustrates example hyperparameters of a model.

Hyperparameters 2504 that may be tuned include those shown in FIG. 25, e.g., hyperparameters related to the model structure 2508 (e.g., for a MLP, number of layers, nodes per layer, etc.), hyperparameters related to the training process 2512 (e.g., for a MLP, number of epochs, learning rate, etc.), and additional application-specific hyperparameters 2516. Application-specific hyperparameters may include hyperparameters related to which variables of the full set of input variables are chosen as input features used to train the model. For example, and as discussed elsewhere herein, a certain number of input variables that are the most important with regard to predicting the target are selected to be input features (see step 1850 of FIG. 18). This number may be a tunable hyperparameter. Similarly, the number of randomly-selected additional variables (m) in step 1860 may be a tunable application-specific hyperparameter. The precise variables selected in step 1860 may be a tunable application-specific hyperparameter. The number of features extracted from the non-selected variables is step 1870 may be a tunable application-specific hyperparameter.

Figure 26:
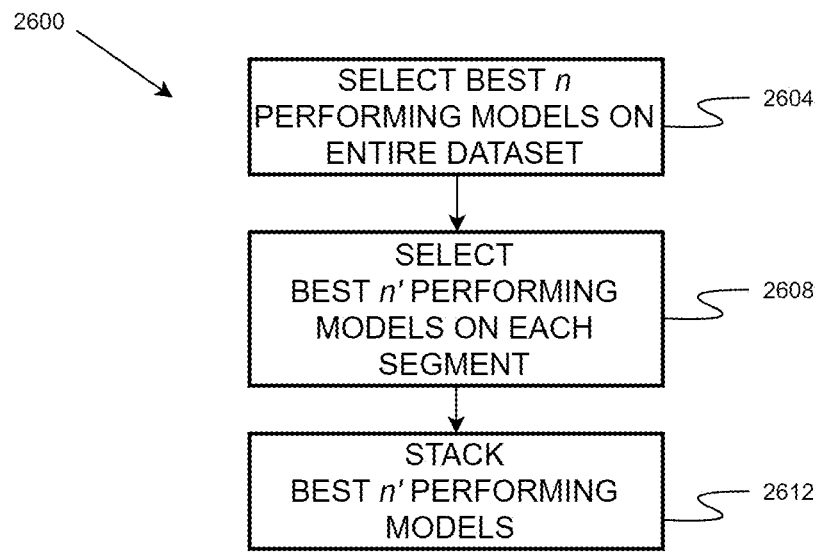
FIG. 26 illustrates an example method for creating an ensemble of models.

In any of the embodiments described herein, a preferred model may be created by model stacking, as illustrated in FIG. 26. In general, model stacking creates a single model that is composed of an ensemble of other models. Sometimes, an ensemble model can generate better predictions than any single individual model.

In step 2604, the best n performing models on the whole test dataset are selected. If an autotuner is used, the best performing models generated by the autotuner are selected. Otherwise, the best performing models with manually selected hyperparameters are selected. The models may be ranked and selected based on criteria including, e.g., RMSE (root mean square error), MSE (mean square error), MAE (mean absolute error), accuracy, precision, recall, etc., between test data and values predicted by the model for the test data. In one embodiment, values for n can range from about 12 to about 20.

In step 2608, among the n models selected in step 2604, the best performing models for each state, group of states, or other geographical segment are selected. The best performing models may be selected based on criteria, e.g., possible overfitting of the models, the error (e.g., RMSE, MSE, MAE, accuracy, precision, recall, etc.) between test data and values predicted by the model when used on only the datasets pertaining to the respective state or groups of states. The best n' models for each state or groups of states are selected. Values for n' can range from about 6 to about 12 for optimal results.

In step 2612, for each state, the models selected in step 2608 are stacked to create the ensemble model. In one embodiment, each model is given equal weight in the ensemble model.

In an alternative embodiment, the ensemble model may comprise a regression model. The predictions of the selected individual models are used as the inputs (features) of the ensemble regression model. The parameters of the ensemble model may be separately tuned.

In one embodiment, the input data may be analyzed to divide the input data into clusters. Clustering refers to dividing input data (e.g., policyholder data, claim data, external data, etc.) into groups with similar attributes in order to provide more stable and accurate loss metric predictions, e.g., pure premium predictions. After the input data has been divided into clusters, the data for each cluster may be used to generate a pure premium development model and a pure premium forecast model for use in pure premium prediction for each cluster. The accuracy and stability of the pure premium development and forecast models generated for a cluster may be evaluated and used to iteratively update and improve the clusters.

Figure 27:
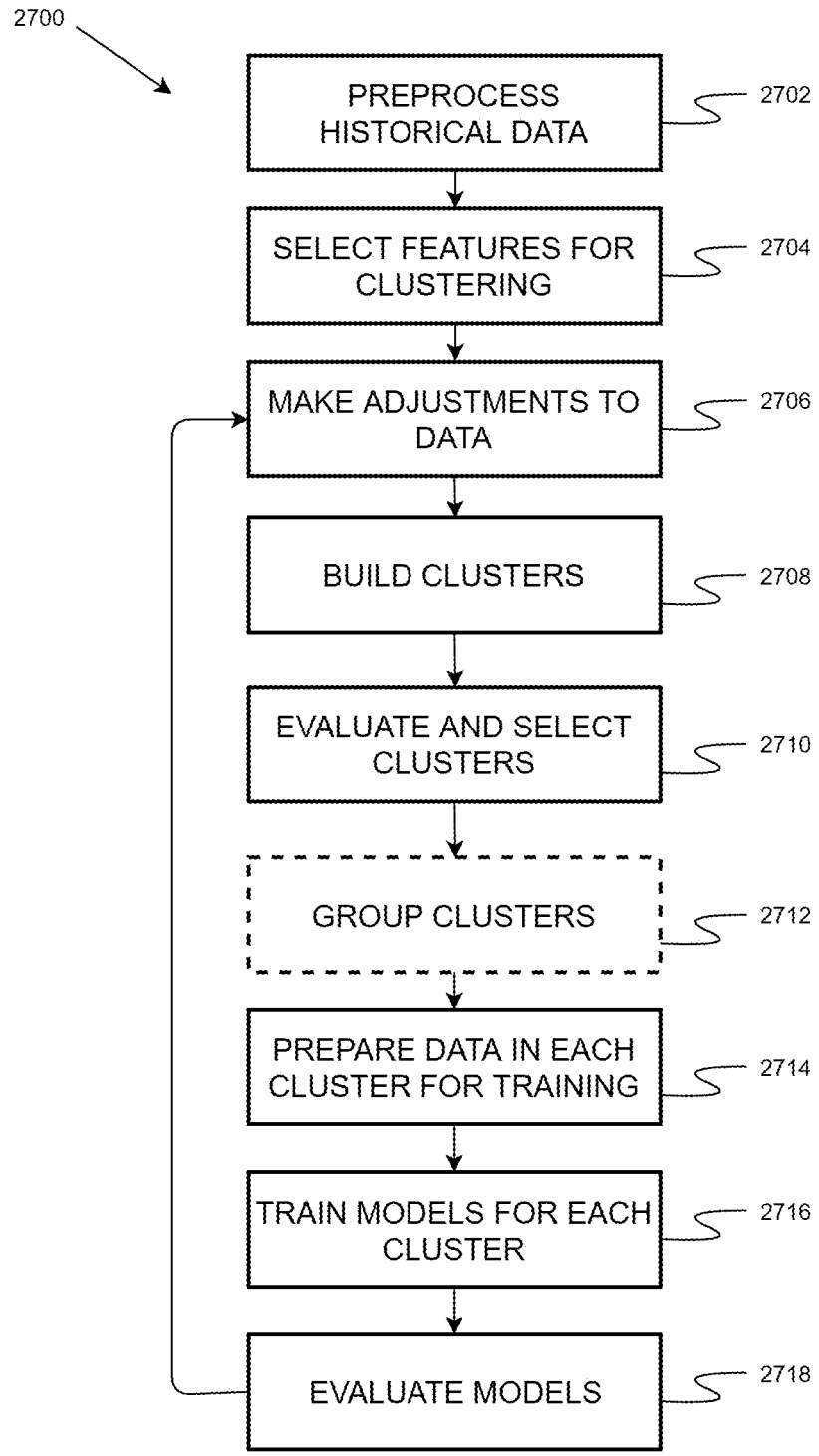
FIG. 27 illustrates an example method for data clustering.

A clustering method 2700 that may be applied to the input data is described in FIG. 27. In step 2702, the historical data is joined, cleaned, and aggregated. In one embodiment, the data is aggregated to the zip code level, but other aggregations can used, e.g., other geographical units (e.g., state, MSA, etc.), even non-geographic policyholder variables (e.g., age), etc. The data is further aggregated to a specified time granularity, e.g., monthly, quarterly, etc. A longer time granularity is preferred when the data is too volatile (e.g., the standard deviation is too high) to give reliable results. For example, a quarterly granularity may be used when the pure premium data on a monthly basis is too volatile. The rest of the explanation of this method will refer to a quarterly granularity.

The data included in the historical dataset includes historical total paid loss and its changes over time, historical pure premium and its changes over time, historical exposure and its changes over time, pure premium variance over time, historical policyholder variables, historical claims variables, and external variables (e.g., weather, traffic, population, housing, etc.). Each of these is described in detail herein. Cleaning data is performed substantially as described with respect to step 1412 of FIG. 14.

After the historical data is joined, cleaned, and aggregated, the final dataset includes, for each zip code, the quarterly pure premium, quarterly bodily injury policyholder and policy variables, quarterly bodily injury claims variables, quarterly collision and property damage claims variables, and external variables.

In step 2704, features on which the clustering is to be performed are selected. Features may include commonly known risk factors, e.g., age, number of cars, number of drivers, etc. Selected features may also include the top n features determined to have the most effect on the pure premium using the feature engineering methods described herein with respect to FIG. 18.

One or more additional created features may also be added to the feature set. For example, the quarterly pure premium for each zip code may be averaged with the quarterly pure premium of nearby zip codes to create a "smoothed" quarterly pure premium for the zip code. Also, the mean, trend, and/or standard deviation of the pure premium over the time series (using the smoothed pure premium) for each zip code may be calculated and added to the feature set.

In one embodiment, the historical dataset may be segmented, e.g., into states, groups of states, or other geographic regions, and the clustering analysis described below perform on each segment, rather than the entire dataset. A different clustering algorithm may be used for each state or state group.

In step 2706, the input data and/or the hyperparameters of the clustering algorithms may be adjusted based on the stability and/or accuracy of the pure premium development and forecast models generated in step 2716. Initially, zip codes with no data, or with a pure premium standard deviation above a threshold, may be removed from the input data.

If the pure premium development and/or forecast models generated in step 2716 are insufficiently accurate or unstable, the inputs to the clustering algorithms or the hyperparameters of the clustering algorithm are adjusted to generate new clusters that provide a more stable or accurate pure premium forecast. For example, the threshold standard deviation may be lowered, removing the more unstable input zip codes from the input dataset. As another example, the number of clusters generated by the clustering algorithm can be altered or the clustering algorithm can be re-run with a new random seed or starting position.

In step 2708, one or more clustering algorithms are applied to the selected features to build the cluster sets. Any suitable clustering algorithm, e.g., k-means, k-medians, mean shift, DBSCAN, GMM (Gaussian mixture model), hierarchical clustering, affinity propagation, spectral clustering, etc., may be used. Depending on the particular clustering algorithm(s) used, one or more pre-defined variables may need to be specified in advance, e.g., for k-means, the number of clusters must be specified.

In step 2710, the cluster sets created in 2708 are evaluated to determine the most suitable set of clusters for use in pure premium forecasting. The cluster sets may be evaluated based on one or more of several factors, including cluster separation, provision of clear trends regarding the pure premium, and exposure coverage of the clusters in the set.

In one embodiment, cluster separation for a set of clusters is determined by comparing the distance between the centers of the clusters with the size of the clusters. The size of a cluster may be calculated by taking the average distance between the center of the cluster and the points of the cluster. Other known cluster separation metrics may also be used.

Clarity of the pure premium trends for a set of clusters may be determined by calculating the standard deviation of the pure premium over time. For a pure premium displaying a cyclical pattern, the clarity of the cyclical pattern may be evaluated instead.

Exposure coverage is the percentage of the original input dataset (i.e., before zip codes are removed as outliers or for having too much volatility) that are in the set of clusters.

In optional step 2712, the clusters are grouped based on the pure premium distributions of the clusters. In one embodiment, clusters with similar pure premium distributions may be grouped together. For example, clusters with a pure premium generally in the same range, e.g., below $100, between $100 and $200, etc., may be grouped together. As another example, clusters with a pure premium trending in the same direction may be grouped together. The trend of the pure premium data may be calculated by known techniques, e.g., the slope of the linear regression of the pure premium data.

Clusters may also be grouped by similarities in the time it takes for claims to be fully developed, e.g., a histogram showing frequencies of claim development times can be evaluated, and clusters with similar histogram shapes, or similar claim development time means or medians may be grouped together. Clusters may be group by a combination of pure premium distribution, pure premium trend, and claim development time factors.

In step 2714, for each cluster or cluster group identified in step 2710 or 2712, the data in the cluster or cluster group is prepared for use in training a pure premium development model as described in steps 1204 and 1208 of FIG. 12, FIG. 14, and FIG. 18. Depending on the amount of data in the cluster, the input data may be aggregated on a quarterly and accident-quarter basis rather than monthly/accident-month basis.

In step 2716, for each cluster or cluster group, the pure premium development model may be trained using the data prepared in the previous step, substantially as described above with respect to steps 1212 of FIG. 12 and FIG. 21, except the data is aggregated to a quarterly or accident-quarter granularity. In an embodiment, a development model is not trained for clusters or cluster groups that do not include at least a minimum number of data points, as such a model would provide unreliable predictions.

After the pure premium development models are trained, the pure premiums may be calibrated, and the pure premium forecast model may be trained, substantially as described above with respect to steps 1216 and 1220 of FIG. 12 and FIG. 23, except on a accident-quarter or quarterly granularity.

In step 2718, the stability and accuracy of the pure premium forecasts generated by the pure premium development and forecast models can be evaluated, and if insufficient, the method proceeds back to step 2706. Sufficiency may be determined by the error of the forecast, e.g., a 10% error may be determined to be sufficiently accurate.

Figure 30:
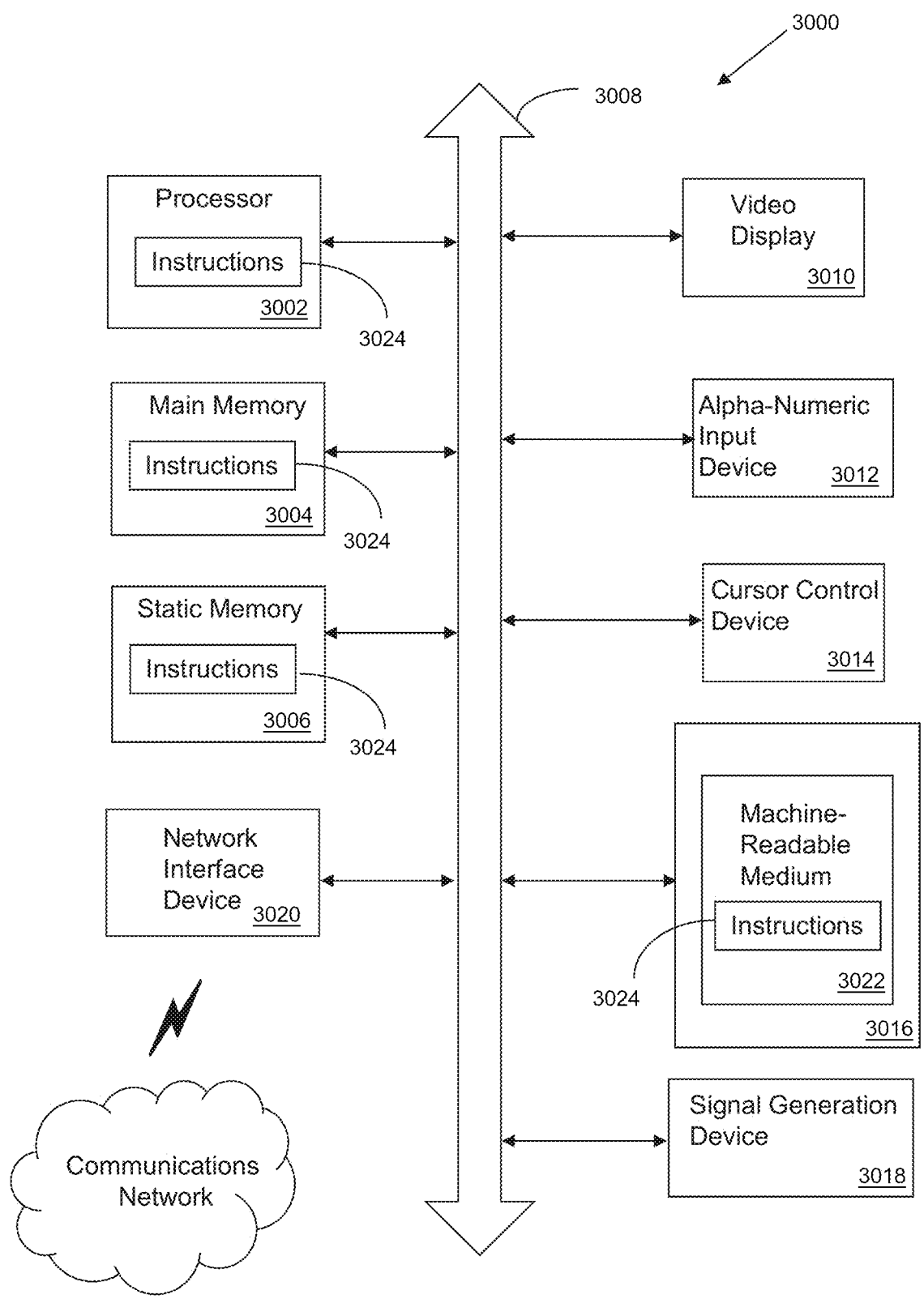
FIG. 30 is a schematic diagram of an example computing system for any of the systems described herein.

FIG. 30 is a schematic diagram of an example computing system for any of the systems described herein. At least a portion of the methodologies and techniques described with respect to the exemplary embodiments of the systems described herein may incorporate a machine, such as, but not limited to, computer system 3000, or other computing device within which a set of instructions, when executed, may cause the machine to perform any one or more of the methodologies or functions discussed herein. The machine may be configured to facilitate various operations conducted by the systems.

In some examples, the machine may operate as a stand-alone device. In some examples, the machine may be connected (e.g., using a communications network) to and assist with operations performed by other machines and systems. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 3000 may include a processor 3002 (e.g., a central processing unit (CPU), a graphics processing unit (GPU, or both), a main memory 3004 and a static memory 3006, which communicate with each other via a bus 3008. The computer system 3000 may further include a video display unit 3010, which may be, but is not limited to, a liquid crystal display (LCD), a flat panel, a solid state display, or a cathode ray tube (CRT). The computer system 3000 may include an input device 3012, such as, but not limited to, a keyboard, a cursor control device 3014, such as, but not limited to, a mouse, a disk drive unit 3016, a signal generation device 3018, such as, but not limited to, a speaker or remote control, and a network interface device 3020.

The disk drive unit 3016 may include a machine-readable medium 3022 on which is stored one or more sets of instructions 3024, such as, but not limited to, software embodying any one or more of the methodologies or functions described herein, including those methods illustrated above. The instructions 3024 may also reside, completely or at least partially, within the main memory 3004, the static memory 3006, or within the processor 3002, or a combination thereof, during execution thereof by the computer system 3000. The main memory 3004 and the processor 3002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various examples of the present disclosure, the methods described herein are intended for operation as software programs running on a computer processor. Furthermore, software implementations can include, but not limited to, distributed processing or component/object distributed processing, parallel processing, or virtual machine processing, which can also be constructed to implement the methods described herein.

The present disclosure contemplates a machine-readable medium 3022 containing instructions 3024 so that a device connected to a communications network can send or receive voice, video or data, and communicate over the communications network using the instructions. The instructions 3024 may further be transmitted or received over the communications network via the network interface device 3020.

While the machine-readable medium 3022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer-implemented method of clustering historical data, the method comprising:
    receiving historical data comprising historical policyholder data, historical policy data, historical claims data, historical environmental data, and historical loss metric data, the historical data further comprising at least one input variable;
    processing the historical data, comprising:
        joining the historical data;
        cleaning the historical data; and
        aggregating the historical data to a specified time granularity and specified second granularity;
    generating a set of features based on the processed historical data;
    inputting the feature set into a plurality of clustering algorithms to generate a plurality of sets of clusters, each clustering algorithm generating a set of clusters based on the feature set, each clustering algorithm comprising one of the following: k-means, k-medians, mean shift, DBSCAN, Gaussian mixture model, hierarchical clustering, affinity propagation, and spectral clustering;
    evaluating each of the plurality of sets of clusters for stability; and
    selecting the most stable set of clusters.

2. The method of claim 1, wherein the specified time granularity is quarterly.

3. The method of claim 1, wherein the specified second granularity is a geographic granularity.

4. The method of claim 1, wherein generating the set of features comprises:
    adding input variables of known importance to the feature set; and
    adding at least one newly created variable to the feature set.

5. The method of claim 4, wherein the newly created variable comprises a smoothed loss metric value.

6. The method of claim 4, wherein the newly created variable comprises a mean of the loss metric over time.

7. The method of claim 4, wherein the newly created variable comprises a trend of the loss metric over time.

8. The method of claim 4, wherein the newly created variable comprises a standard deviation of the loss metric over time.

9. The method of claim 1, wherein the stability of a set of clusters is determined based on the trend of the loss metric of each cluster.

10. The method of claim 1, wherein the stability of a set of clusters is determined based on the separation between the loss metrics of each cluster.

11. The method of claim 1, wherein the stability of a set of clusters is determined based on the exposure coverage of the set of clusters.

12. The method of claim 1, further comprising:
    for each cluster in the set of clusters, training a loss metric model based the historical data comprising the cluster.

13. A method of clustering historical data, the method comprising:
    receiving historical data comprising historical policyholder data, historical policy data, historical claims data, historical external data, and historical loss metric data, the historical data further comprising at least one input variable;
    segmenting the historical data into a plurality of segments;
    processing the historical data, comprising:
        joining the historical data;
        cleaning the historical data; and for each segment, aggregating the historical data to a specified time granularity and specified second granularity;

for each segment, generating a set of features based on the processed historical data;

for each segment, inputting the feature set into a plurality of clustering algorithms to generate a plurality of sets of clusters, each clustering algorithm generating a set of clusters based on the feature set, each clustering algorithm comprising one of the following: k-means, k-medians, mean shift, DBSCAN, Gaussian mixture model, hierarchical clustering, affinity propagation, and spectral clustering;

evaluating each of the plurality of sets of clusters for stability; and for each segment, selecting the most stable set of clusters.

14. The method of claim 13, further comprising grouping a cluster from one segment with a cluster from a different segment based on an attribute of the loss metric of the clusters.

15. The method of claim 14, wherein the attribute relates to the value of the loss metric.

16. The method of claim 13, wherein the specified time granularity is quarterly.

17. The method of claim 13, wherein the specified second granularity is a geographic granularity.

18. The method of claim 13, wherein generating the set of features comprises:

adding input variables of known importance to the feature set; and adding at least one newly created variable to the feature set.

19. The method of claim 18, wherein the newly created variable comprises one of the following: a smoothed loss metric value, the mean of the loss metric over time, the trend of the loss metric over time, and the standard deviation of the loss metric over time.

20. The method of claim 13, wherein the stability of a set of clusters is determined based on one or more of the following: the trend of the loss metric of each cluster, the separation between the loss metrics of each cluster, and the exposure coverage of the set of clusters.

* * * * *